(12) United States Patent
Fisher et al.

(10) Patent No.: US 8,671,077 B2
(45) Date of Patent: Mar. 11, 2014

(54) METHODS, SYSTEMS AND APPARATUSES FOR USE IN UPDATING A PORTABLE STORAGE MEDIUM

(75) Inventors: Diana Louise Fisher, Santa Clarita, CA (US); Andrew Kerr Swan, Santa Clarita, CA (US); Devin Goodsell, Sherman Oaks, CA (US)

(73) Assignee: Deluxe Digital Studios, Inc., Burbank, CA (US)

( * ) Notice: Subject to any disclaimer, the term of this patent is extended or adjusted under 35 U.S.C. 154(b) by 145 days.

(21) Appl. No.: 12/613,490

(22) Filed: Nov. 5, 2009

(65) Prior Publication Data

US 2010/0114853 A1    May 6, 2010

Related U.S. Application Data

(60) Provisional application No. 61/112,121, filed on Nov. 6, 2008.

(51) Int. Cl.
G06F 7/00 (2006.01)
G06F 17/00 (2006.01)

(52) U.S. Cl.
USPC ............ 707/673; 707/696; 707/705; 707/830

(58) Field of Classification Search
None
See application file for complete search history.

(56) References Cited

U.S. PATENT DOCUMENTS

| | | | | |
|---|---|---|---|---|
| 7,630,615 B2* | 12/2009 | Ikeda et al. | .................. | 386/235 |
| 7,984,116 B2* | 7/2011 | Hudson et al. | ................ | 709/219 |
| 8,020,185 B2* | 9/2011 | Zeng et al. | ....................... | 725/86 |
| 8,020,212 B2* | 9/2011 | Takashima | ....................... | 726/27 |
| 2004/0117259 A1* | 6/2004 | Morrisroe et al. | .............. | 705/14 |
| 2004/0186713 A1* | 9/2004 | Gomas et al. | ................. | 704/235 |
| 2004/0242269 A1* | 12/2004 | Fadell | ......................... | 455/556.2 |
| 2005/0237865 A1* | 10/2005 | Ando et al. | ................... | 369/30.3 |
| 2005/0259968 A1* | 11/2005 | Tsumagari et al. | ............. | 386/95 |
| 2006/0140091 A1 | 6/2006 | Iwamoto | | |
| 2006/0161635 A1* | 7/2006 | Lamkin et al. | ................. | 709/217 |

(Continued)

OTHER PUBLICATIONS

International Search Report and Written Opinion of the International Searching Authority for PCT/US2009/063448 mailed May 28, 2010.

(Continued)

*Primary Examiner* — Wilson Lee
*Assistant Examiner* — Jessica N Le
(74) *Attorney, Agent, or Firm* — Fitch, Even, Tabin & Flannery LLP

(57) ABSTRACT

The present embodiments provide methods, apparatuses, and systems for use in providing updating content to be played back in cooperation with a portable processor readable medium. Some of these methods receive, over a network and from a remote source, updated content to be accessed in association with a processor readable portable storage medium; receive, over the network from the remote source, in association with the received updated content a designation that the updated content is to be associated with a first placeholder title as defined in an index table being implemented in association with playback in association with the portable storage medium; and store the updated content, on a separate processor readable storage medium that is different than the portable storage medium, such that the updated content is associated with the first placeholder title and accessible in association with the first placeholder title as dictated by the index table.

16 Claims, 12 Drawing Sheets

(56) References Cited

U.S. PATENT DOCUMENTS

| | | | |
|---|---|---|---|
| 2007/0031112 A1* | 2/2007 | Ricci | 386/95 |
| 2007/0050336 A1* | 3/2007 | Bugir et al. | 707/3 |
| 2007/0086727 A1 | 4/2007 | Tanaka | |
| 2007/0157083 A1* | 7/2007 | Roy et al. | 715/522 |
| 2007/0220021 A1* | 9/2007 | Kato et al. | 707/100 |
| 2008/0195664 A1* | 8/2008 | Maharajh et al. | 707/104.1 |
| 2008/0243828 A1* | 10/2008 | Reztlaff et al. | 707/5 |
| 2008/0244383 A1* | 10/2008 | Duncan et al. | 715/246 |
| 2009/0157731 A1* | 6/2009 | Zigler et al. | 707/102 |
| 2009/0228520 A1* | 9/2009 | Yahata et al. | 707/104.1 |
| 2009/0234823 A1* | 9/2009 | Wong | 707/4 |
| 2010/0034518 A1* | 2/2010 | Iwamoto et al. | 386/95 |
| 2010/0284667 A1* | 11/2010 | Yahata et al. | 386/241 |

OTHER PUBLICATIONS

Fisher, Diana L., U.S. Appl. No. 61/112,121, filed Nov. 6, 2008.
EPO; Result of Consultation with Examiner issued in European Patent Application No. 09 825 435.2; Mailed Jun. 6, 2013; 3 Pages.
EPO; Examination Report issued in European Patent Application No. 09 825 435 2; Mailed May 2, 2013; 4 Pages.
EPO; Extended European Search Report Issued in European Patent Application No. 09825435.2; Mailed Aug. 30, 2012; 7 Pages.
EPO; Examination Report issued in European Patent Application No. 09 825 435.2 mailed Dec. 19, 2013.
Blu-ray Disc White Paper Blu-Ray Disc Format 2.B Audio Visual Application Format Specifications for BD-ROM, Apr. 2004, 35 pages. (cited in EP examination report mailed Dec. 19, 2013).

\* cited by examiner

| | Title # | Title Name | BDJO ID# | Placeholder? | CPS Unit# | Binding Type | Type/Permission |
|---|---|---|---|---|---|---|---|
| 916 | 65535 | FirstPlay/Bootstrap | | | | Content | Basic |
| 918 | 0 | Top Menu | | | 1 | Content | Basic |
| 920 | 1 | Feature/Menu | | | 1 | Content | Basic |
| 922 | 2 | Menu/Bonus/etc | | | 1 | Content | Basic |
| 924 | 3 | Menu/Bonus/etc | | | 1 | Content | Basic |
| 930 | ...J | Updater Application | 88889 | Yes | | Content | Basic |
| 931 | (J+1)-(J+8) | Placeholder 1-8 | 88890-88897 | Yes | 2 | Content | Basic |
| 932 | (J+9)-(J+17) | Placeholder 9-17 | 88898-88906 | Yes | 1 | Content | Basic (Unencrypted) |
| 933 | J+18 | Placeholder 18 | 88907 | Yes | 3 | Content | Enhanced-Cacheable |
| 934 | J+19 | Placeholder 19 | 88908 | Yes | 4 | Media | Enhanced-Instant |
| 935 | J+20 | Placeholder 20 | 88909 | Yes | 4 | Media | Enhanced-Cacheable |
| 936 | J+21 | Placeholder 21 | 88910 | Yes | 5 | Content | Enhanced-Instant |
| 937 | J+22 | Placeholder 22 | 88911 | Yes | 5 | Content | Enhanced-Cacheable |
| 938 | J+23 | Placeholder 23 | 88912 | Yes | 6 | Device/Content | Enhanced-Instant |
| 939 | J+24 | Placeholder 24 | 88913 | Yes | 6 | Device/Content | Enhanced-Cacheable |
| 940 | J+25 | Placeholder 25 | 88914 | Yes | 7 | Device/Media | Enhanced-Cacheable |
| | | | | | 7 | Device/Media | Enhanced-Instant |

FIG. 9

METHODS, SYSTEMS AND APPARATUSES FOR USE IN UPDATING A PORTABLE STORAGE MEDIUM

This application claims the benefit of U.S. Provisional Application No. 61/112,121, filed Nov. 6, 2008, for Fisher et al., entitled METHODS, SYSTEMS AND APPARATUSES FOR USE IN UPDATING A PORTABLE STORAGE MEDIUM, which is incorporated in its entirety herein by reference.

FIELD OF THE INVENTION

The present invention relates generally to accessing content from a processor readable medium, and more particularly to providing interaction with content accessed in association with the processor readable medium.

BACKGROUND

Over the last several decades the distribution of content, such as multimedia content, images, video, music and other such content, has increased tremendously. There are a number of different formats for distributing content as well as a number of different mediums upon which content can be stored. Over the last few decades digital recordings of content has become the preferred mode of storing content according to some applications.

Next generation digital media formats, such as Blu-ray Disc and HD-DVD Disc, generally require that data is prepared and stored on a disc in such a manner to describe content that is stored on the disc. Typically, this information is stored in a read only manner that does not support the direct modification of such descriptive data. As such, content played back from the disc is immediately dated when it is recorded to the disc. Further, some data or content stored on the disc can rapidly become outdated or obsolete.

SUMMARY OF THE EMBODIMENTS

The present invention advantageously addresses the needs above as well as other needs through the provision of the methods, apparatuses, and systems for use in providing enhancements to content recorded on portable storage mediums and/or updated content for content recorded on portable storage mediums. Some embodiments comprise methods of updating content to be played back in cooperation with a portable processor readable medium. These methods receive, over a network and from a remote source, updated content to be accessed in association with a processor readable portable storage medium; receive, over the network from the remote source, in association with the received updated content a designation that the updated content is to be associated with a first placeholder title as defined in an index table being implemented in association with playback in cooperation with the portable storage medium; and store the updated content, on a separate processor readable storage medium that is different than the portable storage medium, such that the updated content is associated with the first placeholder title and accessible in association with the first placeholder title as dictated by the index table.

Other embodiments include methods of providing, over a network to a remote playback device locally accessing a processor readable portable storage medium, updated content for content recorded on the portable storage medium, the method of providing the updated content by receiving, over a network from a remote playback device locally accessing a processor readable portable storage medium, a request for updated content for the portable storage medium; identifying updated content for use with the portable storage medium; identifying a placeholder title within a title structure associated with the portable storage medium and with which the updated content is to be associated; identifying, as defined by the identified placeholder title within the identified title structure, a storage location associated with the identified placeholder title; and forwarding an update response identifying the updated content and instructions that the playback device store, within a virtual file system at the playback device, the updated content at the storage location.

Further embodiments provide methods of acquiring updated content to be played back in association with a processor readable portable storage medium. These methods detect access to a processor readable portable storage medium; access, in response to detecting the initial access, an index table associated with the portable storage medium; implement a first application as defined by the index table, where the implementing the first application comprises: requesting, over a network, an update to the portable storage medium from a remote source; receiving, over the network, updated content from the remote source; identifying that the updated content is to be associated with a placeholder title defined in the index table; storing, within a virtual file system on a separate processor readable storage medium, the updated content such that the updated content is associated with the placeholder title; and initiating a title jump, within the index table, to the placeholder title; accessing, in response to the title jump to the placeholder title, the updated content as defined by the placeholder title; and initiating, in response to accessing the updated content, a second application from the updated content.

Still further embodiments comprise methods of providing updated content associated with a processor readable portable storage medium. These methods detect local access to a processor readable portable storage medium; access an index table associated with the portable storage medium; detect, in accordance with the index table, an instruction to implement an update of the portable storage medium; identify, in response to the detecting the instruction, a remote source from which an update for the portable storage medium is to be obtained; request, over a network, the update from the remote source; receive updated content from the remote source; receive a storage location defined in a virtual file system stored on a separate processor readable medium; and store, in the virtual file system, the updated content at the storage location designated by the remote source such that the updated content is associated with a placeholder title defined within the index table such that the updated content is accessed in association with the placeholder title.

Some embodiments comprise methods of providing updating content to be played back in cooperation with a portable processor readable medium. These methods receive, over a network from a remote source, updated content to be accessed in association with a processor readable portable storage medium; receive, over the network from the remote source, in association with the received updated content a designation that the updated content is to be associated with a first placeholder title as defined in an index table recorded on the portable storage medium; and store the updated content, on a separate processor readable storage medium that is different than the portable storage medium, such that the updated content is associated with the first placeholder title and accessible in association with the first placeholder title as dictated by the index table.

Some embodiments additionally or alternatively provide methods of authoring a media image to be recorded on a processor readable portable storage medium. These methods of authoring establish an index table that dictates the playback of content in association with accessing the portable storage medium; define a first title within to the index table; associate the first title with a first application object; define a second title within the index table; associate the second title with a first multimedia object; define a first placeholder title within the index table; and associate first null data with the first placeholder title.

Further embodiments include methods of providing, over a network to a remote playback device locally accessing a processor readable portable storage medium, updated content for content recorded on the portable storage medium. These methods receive, over a network from a remote playback device locally accessing a processor readable portable storage medium, a request for updated content for the portable storage medium; identify updated content for use with the portable storage medium; identify a title structure of the portable storage medium; identify a placeholder title within the identified title structure with which the updated content is to be associated; identify, as defined by the identified placeholder title within the identified title structure, a storage location of content to be accessed by the playback device in accordance with instructions associated with the placeholder title; forward an update response identifying the updated content and instructions that the playback device store, within a virtual file system at the playback device, the updated content at the storage location.

Additionally, some embodiments provide methods of acquiring updated content to be played back in association with a processor readable portable storage medium, at least in part, by detecting access to a processor readable portable storage medium; accessing an index table associated with the portable storage medium; implementing a first application as defined by the index table, where the implementing the first application comprises: requesting, over a network, an update to the portable storage medium from a remote source; receiving, over the network, updated content from the remote source; identifying that the updated content is to be associated with a placeholder title defined in the index table; storing, within a virtual file system on a separate processor readable storage medium, the updated content such that the updated content is associated with the placeholder title; and initiating a title jump, within the index table, to the placeholder title; accessing, in response to the title jump to the placeholder title, the updated content as defined by the placeholder title; and initiating, in response to accessing the updated content, a second application from the updated content.

Still further, some embodiments comprise methods of providing updated content relative to a processor readable portable storage medium. These methods detect local access to a processor readable portable storage medium; access an index table associated with the portable storage medium; detect, in accordance with the index table, an instruction to implement an update of the portable storage medium; identify, in response to the detecting the instruction, a remote source from which an update for the portable storage medium is to be obtained; request, over a network, the update from the remote source; receive updated content from the remote source; receive a storage location defined within a virtual file system stored on a separate processor readable medium; and store, in the virtual file system, the updated content at the storage location designated by the remote source such that the updated content is associated with a placeholder title defined within the index table such that the updated content is accessed in association with the placeholder title.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The above and other aspects, features and advantages of the present invention will be more apparent from the following more particular description thereof, presented in conjunction with the following drawings wherein:

FIG. 9 depicts an example listing of at least a portion of the titles defined within a title structure according to some embodiments;

Figure 1:
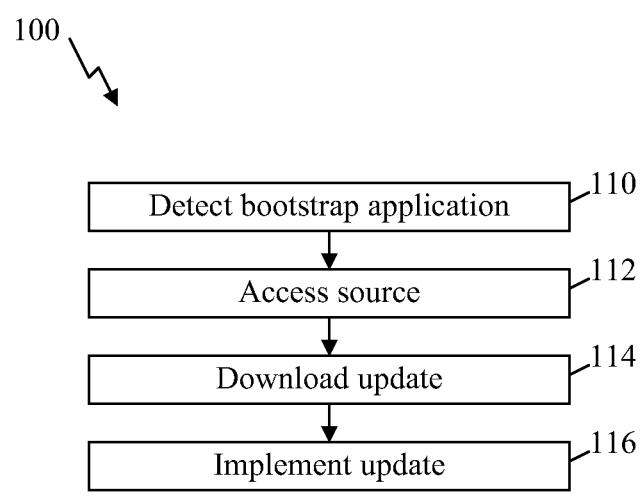
FIG. 1 depicts a simplified flow diagram of a process of implementing the bootstrap application according to some embodiments.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The present embodiments provide methods, systems, computer code and applications for use in providing updated content relative to a computer and/or processor readable portable storage medium, where the medium typically cannot be altered after the medium is burned, pressed and/or released, such as a read only memory. In some particular applications the present embodiments provide the capabilities to update a processor readable portable storage medium recorded in accordance with the Blu-ray Specification. This update capability, in part, is recorded on the portable storage medium, provides a generic bootstrap functionality that allows a consumer electronic device, accessing the portable storage medium, to update the medium in substantially any fashion, including providing additional functionality relative to the portable storage medium, provide additional content to be played back in relation to and/or cooperation with the portable storage medium, provide content to be played back in place of content recorded on the portable storage medium, provide controls and/or structure that override controls and/or structure defined on the portable storage medium and substantially any other relevant update. As a result the present embodiments can, in part, supply fixes for bugs or glitches on a portable storage medium; provide future proofing of the medium; provide remote debugging through a remote device accessible by a playback device accessing the portable storage medium; dynamically update content in association with the portable storage medium across multiple discs, content distributed and/or content owners (e.g., movie studios, music labels, and the like); provide the dynamic updating without having to retrieve new or additional content protection, such as keys, copy protection system (CPS) units and/or keys, and/or other such protections; track, archive and/or log update distributions; provide additional functionality; distribute additional and/or enhanced content; effectively disable access to some or all of the content on the portable storage medium; provide relevant and/or focused marketing; reduce costs at least associated with production and distribution; provide potential revenue stream; provide improved performance, in part, by providing quicker access to content, reducing and/or eliminating some delays, reduce numbers of operations performed, and reduce amounts of data communicated; provide greater flexibility in provide updates; and other such functionalities and advantages. Similarly, the updates can be full updates to a playback device, and/or incremental updates to prior updates previously provided to a playback device.

As an example, some present embodiments provide a generic bootstrap application that is used to update Blu-ray discs via a network connected Blu-ray playback device. To simplify the description below, the present embodiments are described blow with reference to the Blu-ray Specification, and in particular with respect to Blu-ray discs that comply with the Blu-ray Specification. It is noted, however, that the present embodiments, including but not limited to the dynamic updating, bootstrap application implementation and title structure, are not restricted to Blu-ray discs (or other such mediums) or the Blu-ray Specification. Instead, at least some of the present embodiments can be applied to a variety of portable storage mediums as will be apparent to those skilled in the art. Further, for simplicity, the description below will reference a disc as an example of the computer readable and/or processor readable portable storage medium. Again, however, the present embodiments are not limited to a disc and can apply to a flash card or drive, read only flash card, flash memory, secure digital (SD) card, universal serial bus (USB) stick or drive, other memory cards, and/or other such portable processor readable storage mediums.

Some embodiments initiate an update through a bootstrap application that connects over a network to a remote source configured to provide updates, such as to a movie studio domain associated and controlled by the movie studio owning the rights to the content on the disc. Once connected, the bootstrap application can implement a download of a bootstrap updated, which can include but is not limited to, file and/or title structure definitions (e.g., Binding Unit Manifest File (BUMF), a Binding Unit Signature File (BUSF)), multimedia content, executables, control structures, applications and other such updates. In some implementations, an updater application can further be updated and/or added to the playback device that can subsequently be utilized by the playback device to obtain updated content, such as multimedia content to be played back in cooperation with the disc. Further, the bootstrap application is generic and can be utilized on various discs for substantially any content provider. The authorized access to the source provider and/or to other updates is defined, in some embodiments, by a specified source within the bootstrap application and/or by the source provider upon performing a confirmation, for example, of the portable storage medium and/or playback device. As described above, the disc once produced and burned typically cannot be altered. Providing updates to such discs is particularly advantageous. Some embodiments further allow updates that are not know or predicted, as well as provide a generic title structure that can be used across multiple different discs for multiple different content owners that allows the dynamic updating of the discs.

The bootstrap functionality or application accesses, over a network, one or more remote sources to retrieve applications, content and the like to provide an update to the disc. Further, the bootstrap application allows the update to take place without prior knowledge of the update (e.g., updated content, functions, applications or the like), and without the update being defined in the disc or the playback device, and without knowing what the update comprises.

In many instances, the updates are not know, may not be predicted and/or may not comply with certain limited criteria. The present embodiments, however, can update without prior knowledge and typically without restrictions as long as the updates comply with the playback device and any restrictions, for example, as dictated by a standard (e.g., the Blu-ray Specification). Further, the bootstrap application provides backward compatibility for devices that do not have network access and/or can similarly operate with devices that at the time of access to the disc do not have access to a network, while still allowing effectively a turning on of the update functionality when the network connectivity, at some time in the future, should network connectivity later be established.

The bootstrap application is recorded on the disc and is relatively simple. FIG. 1 depicts a simplified flow diagram of a process 100 of implementing the bootstrap application. In step 110, the playback device detects that a bootstrap application is defined on the disc. In step 112, the playback device accesses over a network the source, typically as defined in the bootstrap application. In step 114, the playback device downloads an update from the source, which can include updated multimedia content, applications, menus, control structures and other such updated content. As described above, the update can additionally including, in some implementations, an updater application. Further, in some instances, the update can be an incremental update, for example, an incremental update to a prior update previously obtained by the playback device. In step 116, the playback device implements the update, which can include a jump to the downloaded application, such as the updater application when present that can implement further updates.

In some implementations the bootstrap application is purposely kept simple because the logic is fixed and generally does not need to be updated. In alternative embodiments, however, the bootstrap application can be updated, with the updated version being stored in local storage of the playback device. The bootstrap application, in some embodiments, can also provide a layer of security through self authentication and/or authentication in conjunction with the source or other networked authentication. Additionally, in some implementations, the bootstrap application can provide detection functionality regarding updates, while being localized to the playback device and disc, and provides logic and/or decision capabilities at the playback device, in addition to decision capabilities provided through a remote source. Still further, some embodiments provide a title structure that enhances updating, and in some instances allows some updates. The title structure at least in part provides placeholder or dummy titles authored on the disc that at least enable media-binding and device binding. Further, some embodiments employ placeholder titles that handle different types of security scenarios, such as AACS scenarios without having to download special updates or purchase additional keys or security rights.

Figure 2:
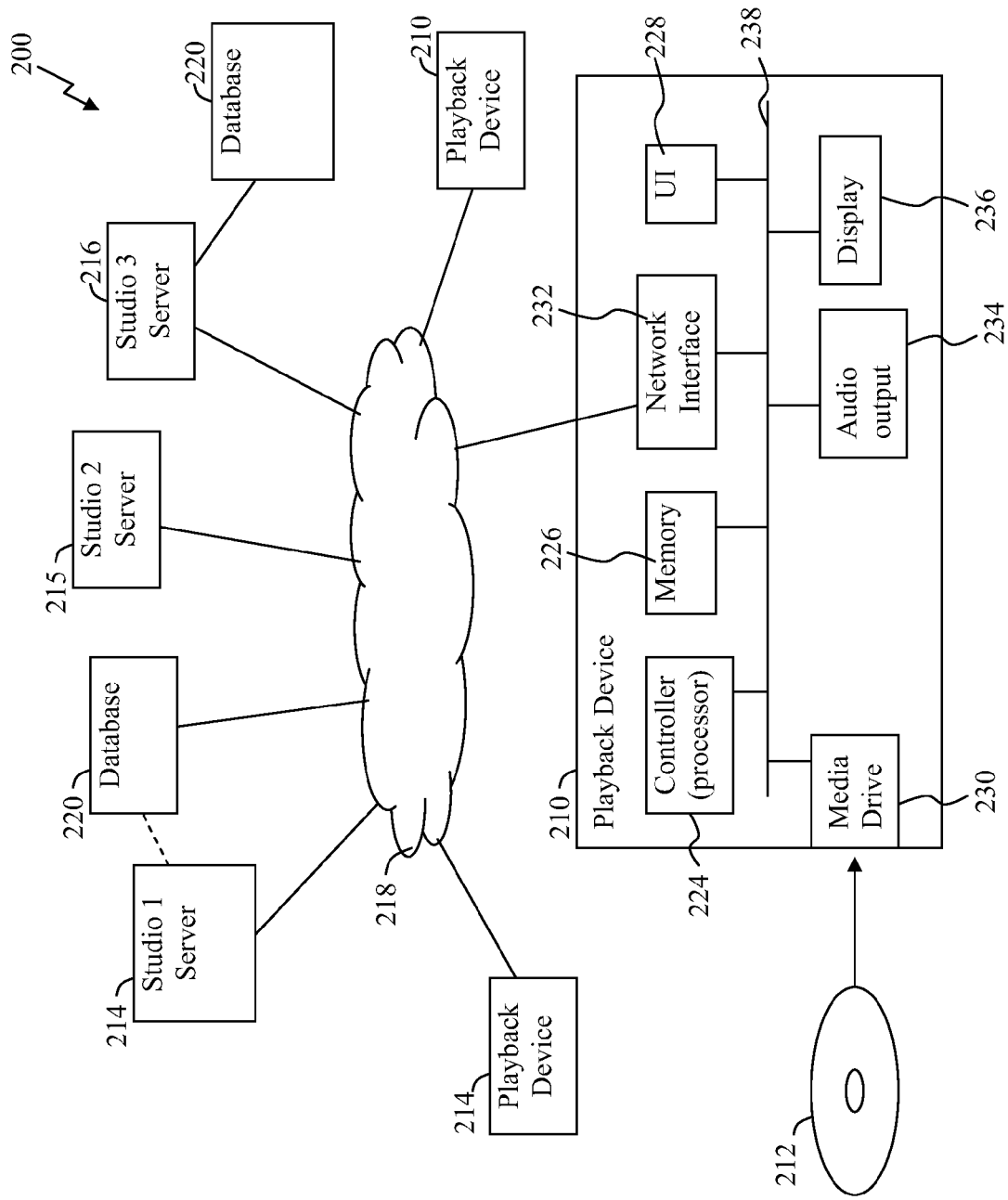
FIG. 2 depicts a simplified block diagram of a system that enables playback devices accessing content on a disc the ability to receive updates and/or updated content relevant to the disc.

FIG. 2 depicts a simplified block diagram of a system 200 according to some embodiments that provides playback devices or systems 210 accessing and/or playing back content from a disc 212 (or other relevant portable processor readable storage medium, such as a flash card or drive, read only flash card, flash memory, SD card, USB stick, other memory cards or other portable processor readable storage medium) the ability to receive updates and/or updated content relevant to the disc 212. The playback device(s) is further coupled with one or more remote sources 214-216 accessible over a network 218. Further, the remote sources 214-216 may additionally be directly and/or indirectly coupled with additional and/or external memory and/or databases 220. The remote sources can be servers, computers and/or other relevant devices. In implementing the bootstrap application, the playback device 210 accesses a remote source, for example source 214, in attempts to acquire the update, such as an updater application that is subsequently implemented by the playback device 210 to receive content updated relevant to the disc 212.

The playback device 210 can include one or more controllers 224, memory 226, user interface(s) 228, medium drive 230, network interface 232, audio output 234, a display driver and/or display 236, one or more communication links or buses 238 and other similar components. The controller 224 can be implemented through one or more processors, microprocessors, minicomputers, computers, or other such processing devices or combinations of devices appropriately configured to access and implement code, software, scripts, processing and the like to, at least, provide updates for the disc 212. In some embodiments, the controller 224 includes video and/or audio processing functionality, such as decoders, encoders and the like that can be implemented through hardware, software or a combination of hardware and software, and in some instances, the video and/or audio processing functionality can be implemented through separate devices and/or functionality (not shown) cooperated with the controller 124. In many instances, the controller 124 can utilize and/or implement the use of content protection, such as encryption, decryption or other such protection processing. Further, the controller 124 and/or one or more processors of the playback device 210 can implement through software recorded on the disc 212, the memory 226 or received over the network 218.

The memory 226, coupled with the controller 224, typically includes one or more processor readable and/or computer readable media accessed by at least the controller 224, and can include volatile and/or nonvolatile media, such as RAM, ROM, EEPROM, flash memory or other memory technology. Additionally, the memory 226 is shown as internal to the playback device 210; however, the memory 226 can further include external memory. The external memory can be substantially any relevant memory such as, but not limited to, one or more of flash memory secure digital (SD) card, universal serial bus (USB) stick or drive, other memory cards, hard drive and other such memory or combinations of such memory. The memory 226 can store code, software, executables, scripts, data, content, multimedia content, textual content, audio content, log or history data, user profile information and the like. Further, the memory 226 is separate and different than the disc 212, and can at least temporarily store updated content and/or updated information obtained from remote sources 214-216, virtual file systems and/or structures associated with one or more discs 212, as well as playback parameters and/or preferences in some implementations. In some embodiments, the memory 226 stores software that implements application user interfaces providing a user with a graphical user interface through which the user can interact with the playback device 210.

The network interface 232 allows the playback device 210 to communicate over the network 218 with one or more of the remote sources 214-216. The user interface 228 allows the user to interact with the playback device 210, and can include substantially any relevant user interface. For example, the user interface can include one or more of, but not limited to, control buttons, a wireless remote control, touch screen, a stylus pen, a keyboard, a mouse, a joy stick, and/or the like. These and other input devices are often connected to the controller 224 through interfaces that couple to the bus 238, but can be connected by other interfaces, such as a parallel port, an IEEE 1394 serial port, a game port, a USB port, an IR interface, or other such ports. The medium drive 230 receives the disc 212 and allows the controller 224 or other relevant components of the playback device 210 to directly access content and one or more title structures recorded on the disc (e.g., software code, executables, applications, multimedia content, image data, textual data, and the like).

The audio output 234 receives audio signals, for example, from the controller 224 or an audio decoder, and outputs audio content to be heard by a user. In some instances, the audio output drives speakers or cooperates with one or more other devices, such as an amplifier, to generate audio signals. The display driver 236 (and/or display) provides signals to a display to display content from the disc 212, content stored in the controller 224 or memory 226, content received from over the network 218, and other such sources or combinations of the sources. The display driver can couple with substantially any relevant display such as a computer display, television display, a display of a portable device and/or other such displays. In some embodiments, the playback device 210 is a computer, a digital versatile disc (DVD) player, gaming device, portable player device, or other such playback devices.

As introduced above, the playback device 210 accesses remote sources 214-216 in response to instructions from the disc 212, and typically a title structure. The content on the disc 212 is structured to allow the playback device 210 to accurately access the content and provide access to the content in accordance with the structure. For example, with discs that comply with the Blu-ray Specification (BD-ROM discs), a data structure or model typically has at least four layers that managing content files.

Figure 3:
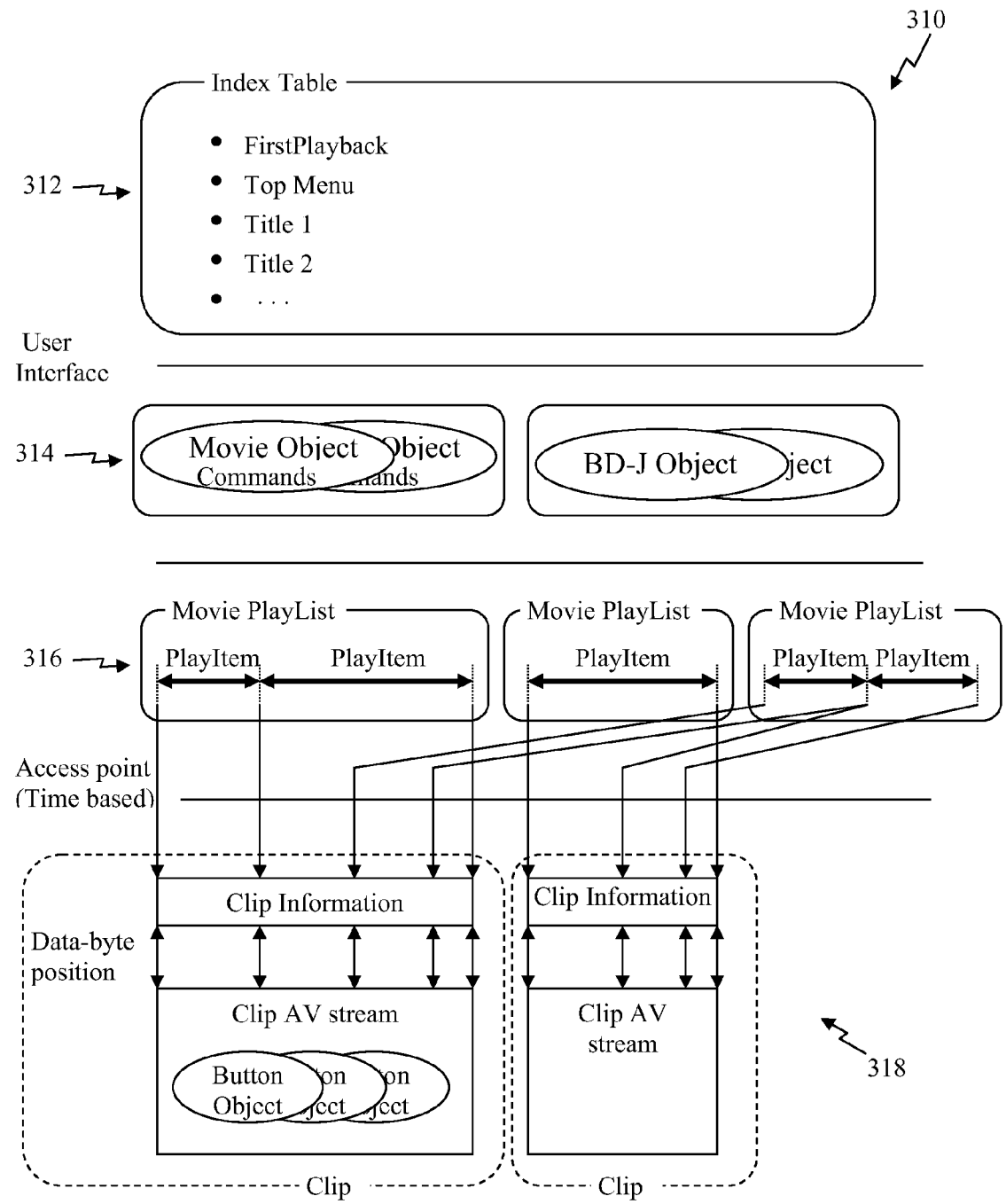
FIG. 3 depicts a simplified block diagram representation of a disc data structure according to some implementations.

FIG. 3 depicts a simplified block diagram representation of a disc data structure 310 according to some implementations, and particularly in compliance with the Blu-ray Specification. The data structure 310 includes an index table 312, a movie object and/or Blu-ray disc (BD) Java object or application (BD-J object) 314, a playlist 316, and clip information 318.

Figure 4:
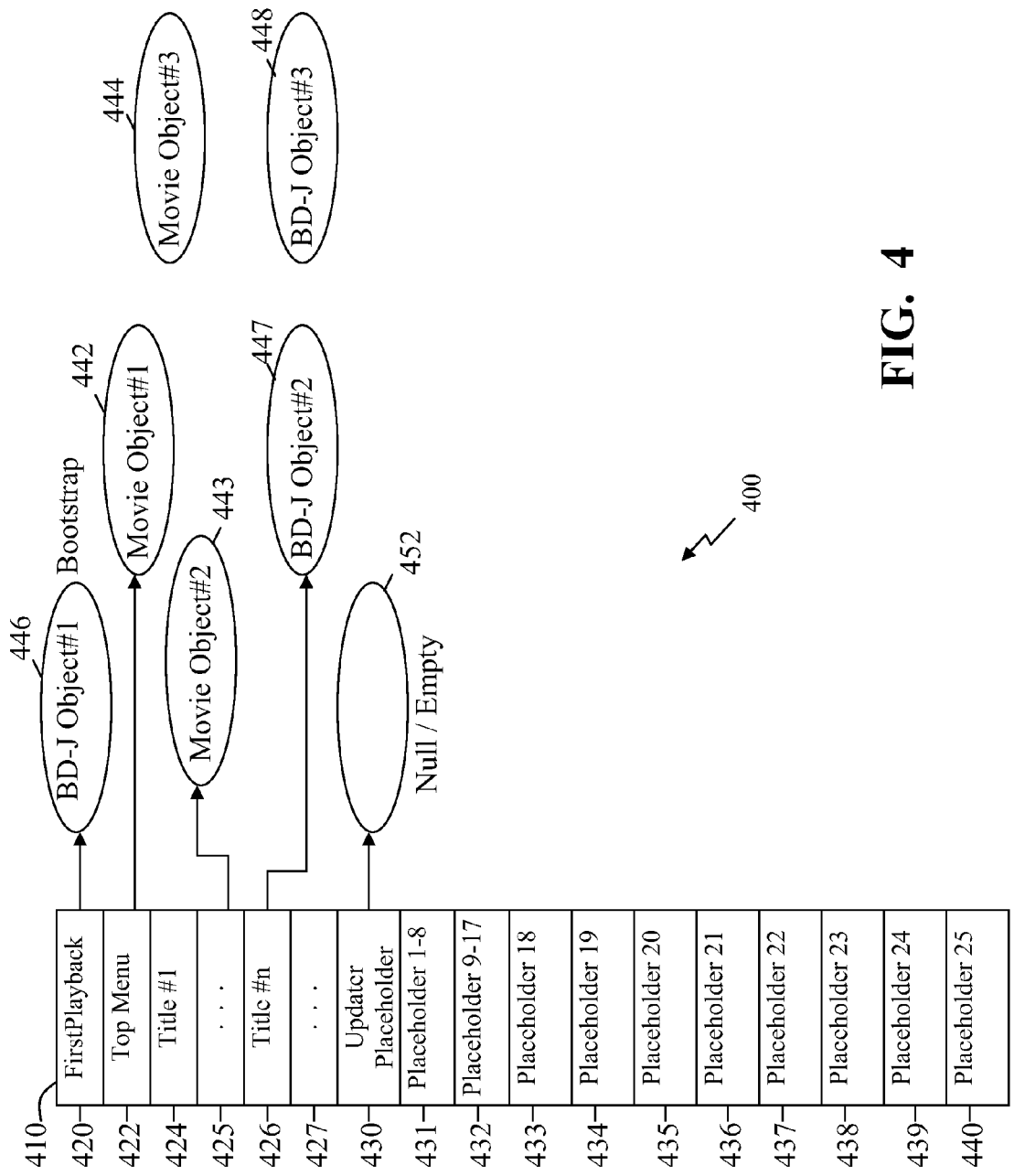
FIG. 4 depicts a simplified block diagram representation of a title structure that includes of an index table according to some implementations.

FIG. 4 depicts a simplified block diagram representation of a title structure 400 that includes an index table 410 according to some implementations. The index table 410 is a top-level title structure that defines the titles of the disc 212. A title corresponds to any entry in the index table 410, such as a "FirstPlayback" 420, a top menu 422, and one or more titles 424-427. The index table 410 additionally includes, according to some present embodiments, one or more placeholder or dummy titles 430-440 that are used in updates, other functionality and/or content, and further enable media-binding and/or device binding, as fully described below. For example, the index table 410 can include an updater application placeholder title 430, a first series of placeholders titles 431 (e.g., placeholders 1-8), a second series of placeholder titles 432 (e.g., placeholders 9-17), and additional placeholder titles 433-440 (e.g., placeholders 18-25). Substantially any number of placeholder titles can be defined in the Index table 410 depending on implementation and intended use.

Typically, entries in the index table 410 link to a movie object 442-444 or a BD-J object 446-448, and the playback device 210 accesses the linked object as dictated by the index table 410. The placeholder titles 430-440, however, typically do not correspond with exiting movie objects or BD-J objects defined or recorded on the disc 212, and instead correspond with dummy or null objects and/or files on the disc. The placeholder titles 430-440 provide for subsequent use to be assigned by the playback device 210, and/or in some instances as instructed by a remote source 214-216, as fully described below. Additionally, one or more empty or null objects, files or data 452 may also be defined and/or recorded on the disc 212, where an empty or null object or file is defined in the index table as being associated with one of the placeholder titles 430-440, and is empty or stores null or generally unusable data. In some instances, the null object or file may be exclusively associated with a placeholder, while in other instances a null object or file may be associated with multiple placeholders.

The FirstPlayback title 420 is typically the first instance implemented by the playback device 210 upon initial detection of access to the disc, such as the insertion of the disc into the playback device, in accordance with the index table 410. In some instances the object associated with the FirstPlayback 420 designated in the index table 410 is automatically played back and/or activated. For example, when a disc 212 is loaded into the playback device 210 the index table 410 is evaluated and if there is a valid entry for the FirstPlayback title 420 the playback device 210 activates the title (e.g., BD-J object 446) associated with the FirstPlayback entry 420 in the index table 410. Again in some embodiments, the FirstPlayback title 420 can be linked with a BD-J object application or a movie object.

In preferred embodiments, the FirstPlayback title 420 is linked with an update or bootstrap sequence application that allows, as introduced above, the playback device 210 to determine whether there are updates available for the disc 212. In some configurations, other title entries in the index table 410 may additionally call the bootstrap application. As described above with reference to step 114 of FIG. 1, the bootstrap application accesses a source 214-216 to retrieve an update, such as an updater application (or new version of an updater application), and downloads the update or updated content (e.g., updater application). Because the index table 410, in some implementations, includes a placeholder title 430 for the updater application, the playback device 210 upon downloading the updater application stores the updater application in association with the updater placeholder title 430 as designated in the index table 410, and in some instances relative to an empty or null file or object 452 as described above and further below. Typically, the update response from the source, for example source 214, has knowledge of the disc structure and layout, including the index table 410, and thus identifies a storage location and specifies the correlation to the updater placeholder title 430. Further, a single update may provide updates for multiple titles in the index table 410. For example, an update may provide a first file for a first title or title set, and further provide a second file for a second title or title set. Furthermore, multiple updates can be implemented in association with a single disc during a single playback instances associated with the disc. For example, an initial update can be activated, for example, in response to the FirstPlayback title, while a second update can occur, for example, later in playback and/or in association with a feature content, such as a movie or the like, recorded on the disc (e.g., a second update to obtain a different ending to the feature content).

As a result, the index table 410 is preconfigured and/or predefined, at the time the disc 212 is authored, burned or pressed, to provide an association for the received update (e.g., updater application) even though the update is not recorded on the disc 212 at the time the index table 410 is recorded to the disc. Further, the playback device 210 upon receiving the updater application stores the updater application in association with the index table 410 to allow access to the updater application in accordance with the index table 210. Further, because of index table 410 includes a title with which the updater application is to be associated upon receipt, the bootstrap application object 446 initiated in accordance with the FirstPlayback title 420 may be defined at the time the disc 212 is burned to also include a jump to the updater application title 430 even though the updater application does not exist on the disc.

The playback device 210, upon receiving the updater application, then initiates the update, in step 116, which can include jumping to the updater application. In implementing the "jump" to the updater application, the bootstrap application object 446 (e.g., a BD-J object) associated with and accessed in accordance with the FirstPlayback title 420 in the index table 410 can in some instances further identify that the jump following the bootstrap application is a jump to the updater placeholder title 430 as defined within the index table 410. Additionally or alternatively, the response from the source to the bootstrap application can identify the title to jump to in accordance with the index table 410.

Figure 5:
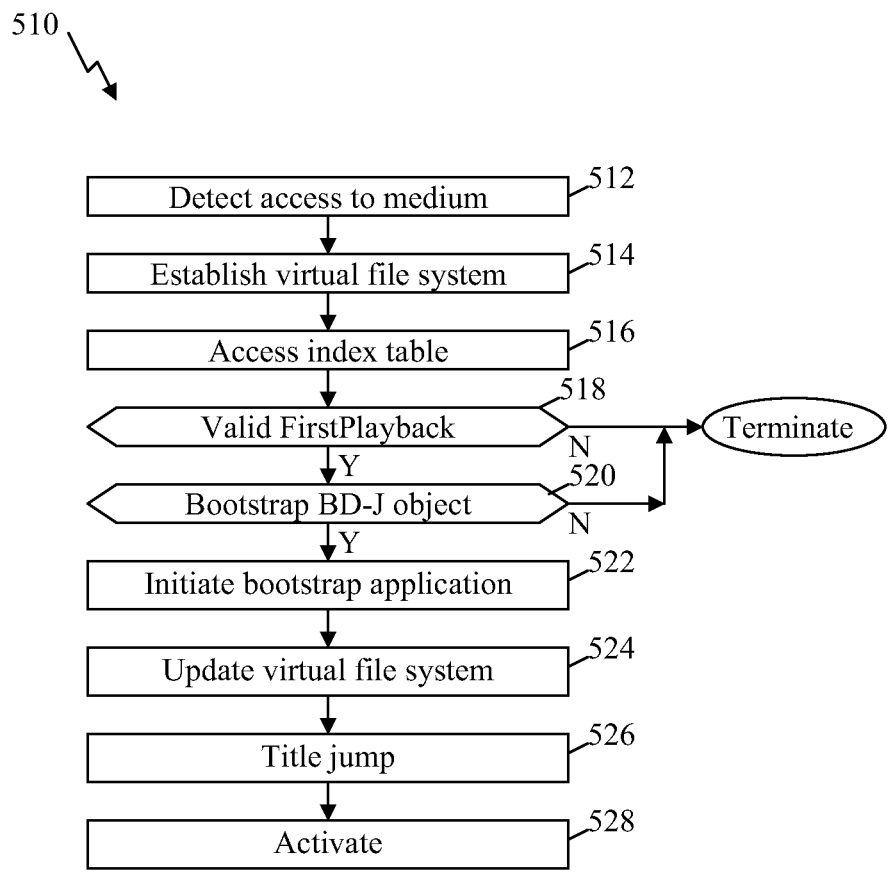
FIG. 5 depicts a simplified flow diagram of a process of implementing an update of a disc at a playback device according to some embodiments.

FIG. 5 depicts a simplified flow diagram of a process 510 of implementing an update of a disc 212 at a playback device 210 according to some embodiments. In step 512, the playback device 210 detects an update or bootstrap application title. In some instances, this bootstrap can be activated upon an initial access to the disc, such as the insertion of the disc 212 into the playback device, the powering up of the playback device or other such initial access, while in other instances the update application may additionally or alternatively be initiated later in the playback sequence of the disc, such as during playback of a feature content to obtain updates to the feature content or a replacement of the feature content. In step 514, a virtual file system is established by the playback device. In step 516, the playback device accesses the index table 410 in response to the detection of the disc 212. In step 518 it is determined whether there is a valid entry in the FirstPlayback title 420. In those instances where there is not a valid entry, the process 510 terminates, and the playback device 210 transitions to a subsequent title, for example top menu title 422. When a valid FirstPlayback title 420 exists step 520 is entered to determine whether the FirstPlayback title corresponds to a bootstrap BD-J object. In those instances where the FirstPlayback title 420 is not a bootstrap BD-J object, the process 510 terminates and the playback device 210 takes appropriate actions relative to the object associated with the FirstPlayback title.

Alternatively, when the FirstPlayback title 420 is a bootstrap BD-J object the process 510 continues to step 522 where the bootstrap application is implemented to download an update, such as a bootstrap update, which can include for example an updater application, as described above and further below. Further, as described above, the update can include one or more files for one more titles or title sets, including a single file that is references across multiple titles, and/or multiple files in a single update that correspond to different titles. Furthermore, in some implementations the determination of whether an update is to occur and what update to implement can be determined by an application implemented through the playback device 210. For example, in response to a request from the playback device for an update, the remote source may provide a listing of relevant updates to the playback device based on one or more parameters and/or variable provided by the playback device. Based on the listing received from the remote source the playback device can determine whether an update is to occur and can select the update to implement. In response to receiving the selection the remote source returns the selected one or more updates.

Following the bootstrap update, the process continues to step 524 where the virtual file system is updated in accordance with the download obtained through the bootstrap application as described above and further below. In step 526, a title jump is performed as defined relative to the bootstrap object and/or bootstrap application associated with the FirstPlayback title 420. In some instances that jump is to the updater placeholder title 430, or some other title defined within the index table 410. In step 528, an updater application (downloaded during the implementation of bootstrap application in step 522) is activated to implement a content update. Once the updater application completes the content update, content from the disc 212 and/or updated content obtained during the content update can be played back in cooperation with the disc. It is noted that the content update of step 524 may continue while and after the virtual file system is updated, and even while content is being played back, for example, with a progressive download.

In some instances conditions and/or checks can be preformed prior to implementing the bootstrap application in step 522. For example, checks can be performed at the playback device 210 that would effectively prevent a bootstrap application from being activated. Below is a simplified example of a portion of an index table 410 specifying titles, and further identifies objects, parameters and/or conditions relative to the objects associated with the identified title (e.g., BD-J object or movie object).

```
FirstPlayback Title BDJO
    BDStubXlet:
        on end calls RegionParentalXlet
    RegionParentalXlet:
        on end calls BDLiveReadyXlet
    BootstrapXlet:
        on end if update available JumpTitle 3,
        else JumpTitle 0
Top Menu Title 0 BDJO
    StandardMenuXlet (title unbound)
    TitleBoundXlet
Title 1 BDJO
    StandardMenuXlet (title unbound)
    TitleBoundXlet
Title 2 BDJO
    OpeningSequenceXlet
Title 3 BDJO
    UpdaterApplicationXlet (placeholder):
        after update, JumpTitle 0
```

The FirstPlayback initiates a potential series of BD-J objects that are conditional prior to subsequent BD-J objects commencing with relation to the FirstPlayback title. In this example, the FirstPlayback title activates a Region and Parental check (RegionParentalXlet) prior to activating the bootstrap application. This check can be performed prior to the bootstrap application, for example, because the bootstrap application is prevented from being activated if this Region and Parental check fails (e.g., parents have not authorized updates to prevent their children from viewing some content). As such at least two paths are provided relevant to the FirstPlayback title.

Additionally or alternatively, these checks can be performed in part to identify an update and/or updated content associated with the disc 212. Similarly, in some embodiments, some or all of the checks can be performed as part of and during the bootstrap application to aid in identifying updated content, and/or implemented through the remote source in determining whether relevant updates or updated content are available. For example, a check can be performed based on a playback device identification (ID), playback device manufacturer ID, a disc ID, one or more organization IDs (which can identify, for example, an entity that owns the rights to content on the disc (e.g., a movie studio), a production company associated with the content on the disc, a distribution company that manufactured, printed, burned and/or distributed the disc, and/or other such organizations), Prerecorded Media Serial Number (PMSN), burst cut area (BCA), IP address (which can be used to also identify a geographic region and/or location within a country and/or the world), an identification of a language (e.g., spoken and/or written language), available local storage space in the memory 226, one or more identifiers of content recorded on the disc (e.g., a feature content ID), and other such information and/or combinations of such information.

Similarly, the "Title 2 BDJO" identified in the above example portion of the index table 410 provides a user with added control over the implementation of the index table and playback of the disc. For example, the "OpeningSequenceXlet" is included in a separate title so that it provides the functionality to be able to MENU out of an opening sequence (e.g., playback warnings/logos/trailers prior to displaying disc menu). As such, the index table and/or the titles within the index table can be configured to provide additional control to accomplish desired results.

Figure 6:
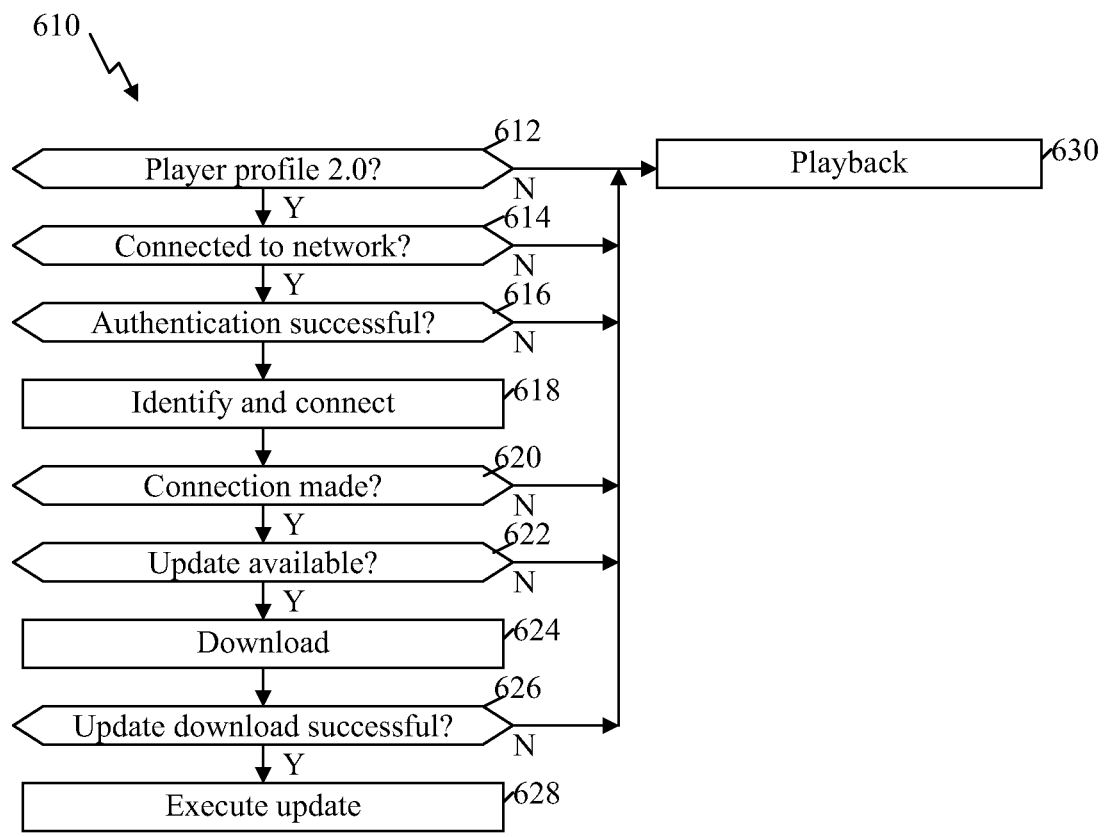
FIG. 6 depicts a simplified flow diagram of a process of implementing a bootstrap application at a playback device according to some embodiments.

FIG. 6 depicts a simplified flow diagram of a process 610 of implementing the bootstrap application at the playback device 210 according to some embodiments. In step 612 it is determined whether the playback device has the capability to connect with a remote source 214-216. For example, a profile version of the playback device is evaluated. As a specific example, Blu-ray compatible playback devices having a version of less than 2.0 are generally not capable of accessing remote sources over the Internet. In those instances where it is determined in step 612 that the playback device is not capable of connecting with the remote source, the process 612 transitions to step 630 where playback of content in association with the disc 212 is implemented without updating. Alternatively, the process 610 continues to step 614 where it is determined whether the playback device 210 is actively connected to the network 218. When the device is not connected normal playback is implemented in step 630.

Step 616 is entered when the playback device 210 is connected with the network 218 to perform authentication on the disc 212 and/or the playback device. Substantially any relevant authentication can be performed, and in some implementations the authentication can verify the integrity of the playback device environment, confirms the validity of the disc and the content, and in some instances may verify rights to access the remote source, e.g., remote source 214. As an example, the authentication can include performing BD authentication, which might include the generation of a unique playback device identifier. When authentication fails the process transitions to step 630 to implement normal playback. Alternatively, when authentication is verified step 618 is entered where a remote source 214 is identified and the playback device attempts to access the remote source. In many implementations the bootstrap application designates the source, for example, by defining a uniform resource identifier (URI), uniform resource locator (URL), providing a source name from which the playback device can use to determine, locate or generate a URI or URL, or other such designations or combinations of designations. Typically, the owner of the content on the disc 212 wants to maintain control of the content and other content and/or applications utilized in cooperation with the disc 212, and as such can incorporate a source from which the update can be obtained or provide access to a source from which the update can be obtained.

In step 620 it is determined whether the connection to the source 214 is established. The process transitions to normal playback in step 630 when the connection cannot be established, for example, within a give time period or threshold. When the connection is established step 622 is entered to determine whether an update for the disc 212 is available. In some embodiments, the playback device 210 is provided with information from the remote source and the playback device makes the determination of whether there is a relevant update available. For example, the remote source may provide a listing of one or more updates, incremental updates and/or partial updates and the playback device 210 can determine whether one or more of the updates are relevant. Further, the remote source and/or the playback device may consider one or more variables, factors and/or parameters in determining whether relevant updates are available and/or in selecting an update. These factors can include, but are not limited to a playback device ID, playback device manufacturer ID (or one or more component manufacturer IDs), a disc ID, one or more organization IDs (which can identify, for example, an entity that owns the rights to content on the disc (e.g., a movie studio), a production company associated with the content on the disc, a distribution company that manufactured, printed, burned and/or distributed the disc, and/or other such organizations), PMSN, BCA, IP address (which can be used to also identify a geographic region and/or location within a country and/or the world), an identification of a language (e.g., spoken and/or written language), available local storage space in the memory 226 (which may include attempting to free-up some local storage if needed), one or more identifiers of content recorded on the disc (e.g., a feature content ID), and other such information and/or combinations of such information. Again, these parameters may be forwarded to the remote source in identifying updates or potential updates, and/or utilized by the playback device 210 in determining whether updates should be obtained.

When it is determined in step 622 that no updates are available normal playback is implemented in step 630. In some embodiments, where the playback device 210 is connected to the network (step 614) and the disc 212 is authenticated (step 616) but there is no update available the normal playback in step 630 may include proceeding with a DSS Network Service Initialization.

In step 624, the update is downloaded from the source 214 or a secondary source as described below. Again, the update may be a full update or an incremental update. For example, an identified update may be an incremental update from a version 7.0 update to a 7.1 update and/or patch. In step 626 it is determined whether the download was successful. When the download was not successful, the process 610 transitions to step 630 to implement normal playback. In some instances, the process returns to step 624 to try and download the update again, and following a predefined number of attempts determines the download was unsuccessful. In those instances where the download is successful, the process 610 continues to step 628 to execute the update. The execution of the update can comprise any number of actions, but some instances includes updating the virtual file system (VFS) and/or virtual package. Further, the execution of the update, in many embodiments, executes the appropriate title jump to a title as defined in the index table 410 or as specified in the updated content, such as jumping to the updater placeholder title 430 and the initiation of the updater application downloaded from the source and stored in accordance with the index table 410.

Figure 7:
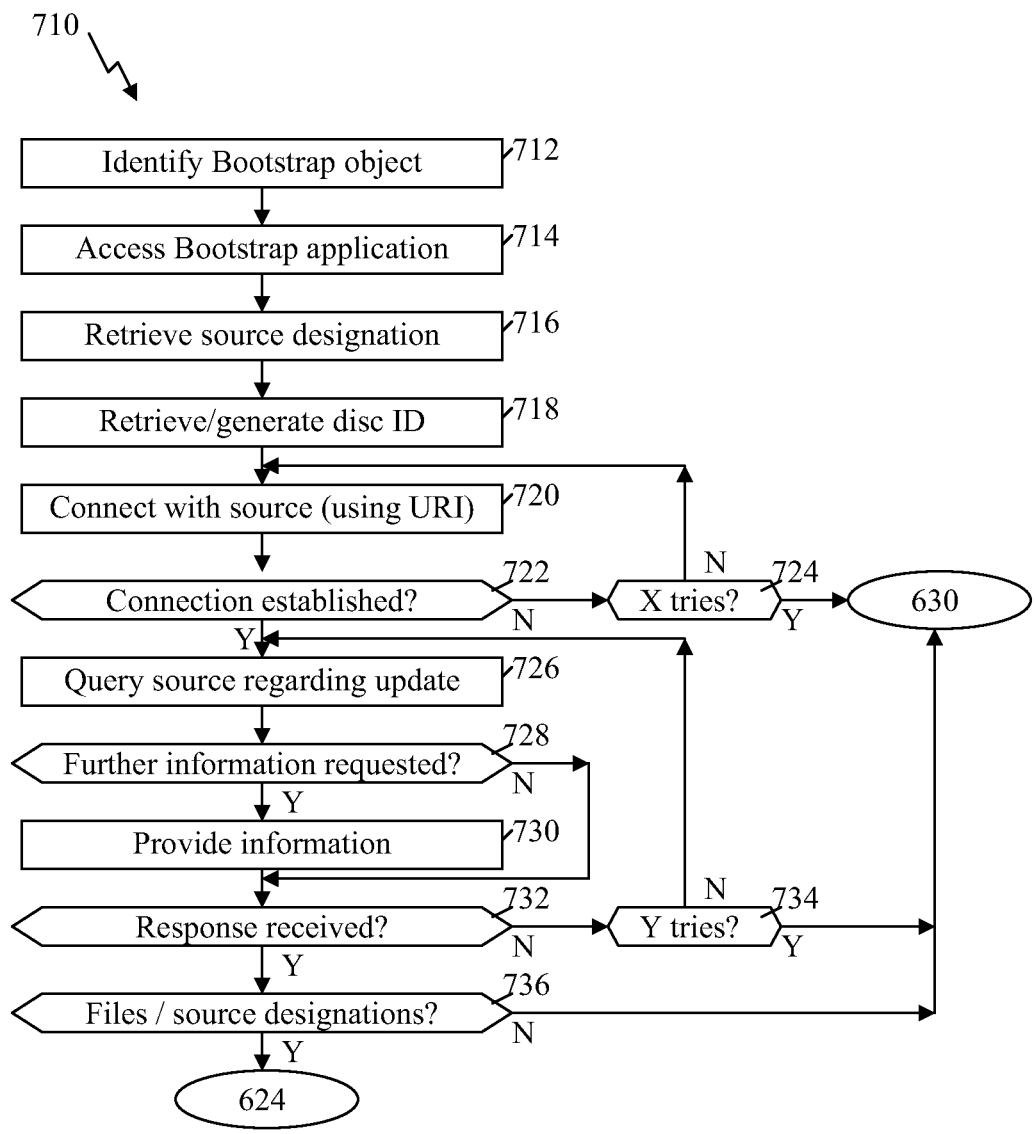
FIG. 7 depicts a simplified flow diagram of a process, according to some embodiments, to determine whether an update is available.

FIG. 7 depicts a simplified flow diagram of a process 710, according to some embodiments, to determine whether an update is available. The process 710 can be used in some embodiments to implement steps 618, 620 and 622 of the process 610. In step 712, the bootstrap application object is identified as designated in the index table 410. In step 714, the bootstrap application descriptor for the bootstrap object is accessed. In step 716 a remote source designation is retrieved or determined from one or more parameters of the descriptor. As described above, this can include a URI, a URL, a name or other descriptor that the playback device can use to access, retrieve or generate an access to the remote source 214. In step 718, a disc identification is retrieved from the disc 212 (e.g., a serial number, product number, content number, other such identifiers or combinations of such identifiers) and/or generated from the disc (e.g., based on amounts of data recorded on the medium, locations of content on the medium, arrangement of portions of content on the medium, locations of certain kinds of content on the medium, and the like). Further in some implementations, a playback device identification is additionally retrieved when available.

In step 720 the playback device 210 attempts to connect with the remote source 214 in accordance with the source designation obtained or determined from the bootstrap descriptor. In step 722 it is determined whether a connection is established with the remote source 214. The determination in step 720 can include, in some embodiments, verifying communication with the remote source, forwarding the disc identification (and playback device identification when available), providing a password, receiving a confirmation from the remote source authorizing access and other such actions. In those instances where the connection is not confirmed the process may continue to step 724 to determine whether the connection was attempted a certain number of times or some other condition regard establishing the connection. In those instance where a connection was attempted the threshold number of times, the process 710 terminates and returns to step 630 to initiate normal playback.

When a connection is confirmed step 726 is entered where a request is communicated to the remote source 214 requesting an update. This request may include forwarding a version of content on the disc (however, the remote source may know this information based on the disc identification), forwarding a current version of any prior updates implemented (again however, this may be known to the remote source based on the disc identification and/or playback device identification and logs or histories maintained by the remote source), or other such data (e.g., a language or menu language value) that allows the remote source to determine whether valid updates are available that are associated with the disc 212. Again, this may include an evaluation of one or more variables or parameters such as those described above and further below. In some embodiments, the request for updates is implemented using an HTTP(S) POST. The post can include the disc identification and player identification, when available, for example, in the header of the HTTP request.

Step 728 determines whether a request for additional information is received from the remote source 214 in response to the connection and/or update request. The requested additional information might include, for example, a request for a password, a verification of a user's age, a payment, a code (e.g., as printed on an authentic disc that might correspond with the disc identification) or other such information. In those instances where further information is requested the process continues to step 730 to supply the requested information, if available, to the remote source 214. The process 710 continues to step 732, when further information is not requested and following step 730, to determine whether an update response to the request for the updated is received. Step 734 may be included to determine whether the request was attempted a certain number of times. When an update response is not received and the request was submitted threshold number of times the process terminates and returns to step 630 for normal playback.

Alternatively, when the update response is received the process determines in step 736 whether a valid update relative to the bootstrap application is received. This can include determining whether the update response includes certain files, locations and/or designations or links to retrieve appropriate resources, such as files, associated with the update. In some instances, the designations can include URIs, URLs or other designations to remote sources from which the files can be retrieved. In those instances where the update response does not return a valid update the process 710 terminates and returns to step 630 to implement normal playback, typically as defined by the index table 410.

A bootstrap update received from a remote source 414 includes, for example when implemented relevant to the Blu-ray Standard, a new or updated Binding Unit Manifest File (BUMF), a Binding Unit Signature File (BUSF), and in some instances the updater application, which can be provided as a Java Program File (JAR) file. Some bootstrap updates may additionally provide an updated index table 410, one or more object files (e.g., BD-J object files), a title number for the updater application, and/or other files and/or information that can be stored and utilized from in local memory 226 of the playback device 210.

The update response received from the remote source 214 in step 732 regarding whether an update is available can define access to and/or provide a listing of the content, files and/or resources to be downloaded in acquiring the bootstrap update. For example, the update response may be provided as an XML string that contains a listing of the files and/or resources to be downloaded for update. Below is a simplified example of an update response from a remote source 214:

```
<update>
    <resourceFile uri="" fileSizeInBytes="" localStorage=""/>
    <resourceFile uri="" fileSizeInBytes="" localStorage=""/>
</update>
<bumf>
    <bumfFile uri="" fileSizeInBytes="" localStorage=""/>
    <busfFile uri="" fileSizeInBytes="" localStorage=""/>
</bumf>
```

In this example the "uri" attribute specifies the URI of the file to be downloaded. Typically, the URI defined by the "uri" attribute is accessed from the same remote source (e.g., remote source 214). In some other instances the URI may designate an alternative remote source (e.g., remote source 213). The remote source associated with the URI, however, typically has to be known and specified on the disc 212, in some implementations, such as those in compliance with the Blu-ray Specification. The "fileSizeInBytes" designates a file size of the file associated with the URI, and the "localStorage" attribute specifies a location where the playback device 210 is to store the file or other content received. For example, the "localStorage" attribute can designate a target Binding Unit Data Area (BUDA) file or storage location within the virtual file system utilized by the playback device 210. Further, the localStorage attribute, in some instances, can correspond with the empty or null file associated with a placeholder title in the index table 410. The element "resourceFile" specifies the files, such as the updater application, associated with the bootstrap update. The element <bumf> specifies the bumf.xml and bumf.sf files that are used for a virtual file system update that is needed in some embodiments when implementing the updater application. The bootstrap application retrieves each resource identified in the update response, for example by implementing an HTTP(S) GET, on each resource specified in the XML update response string returned in step 732. Further, the bootstrap application copies the downloaded files to the locations specified in the response (e.g., "localStorage"), typically in the BUDA local storage.

Figure 8:
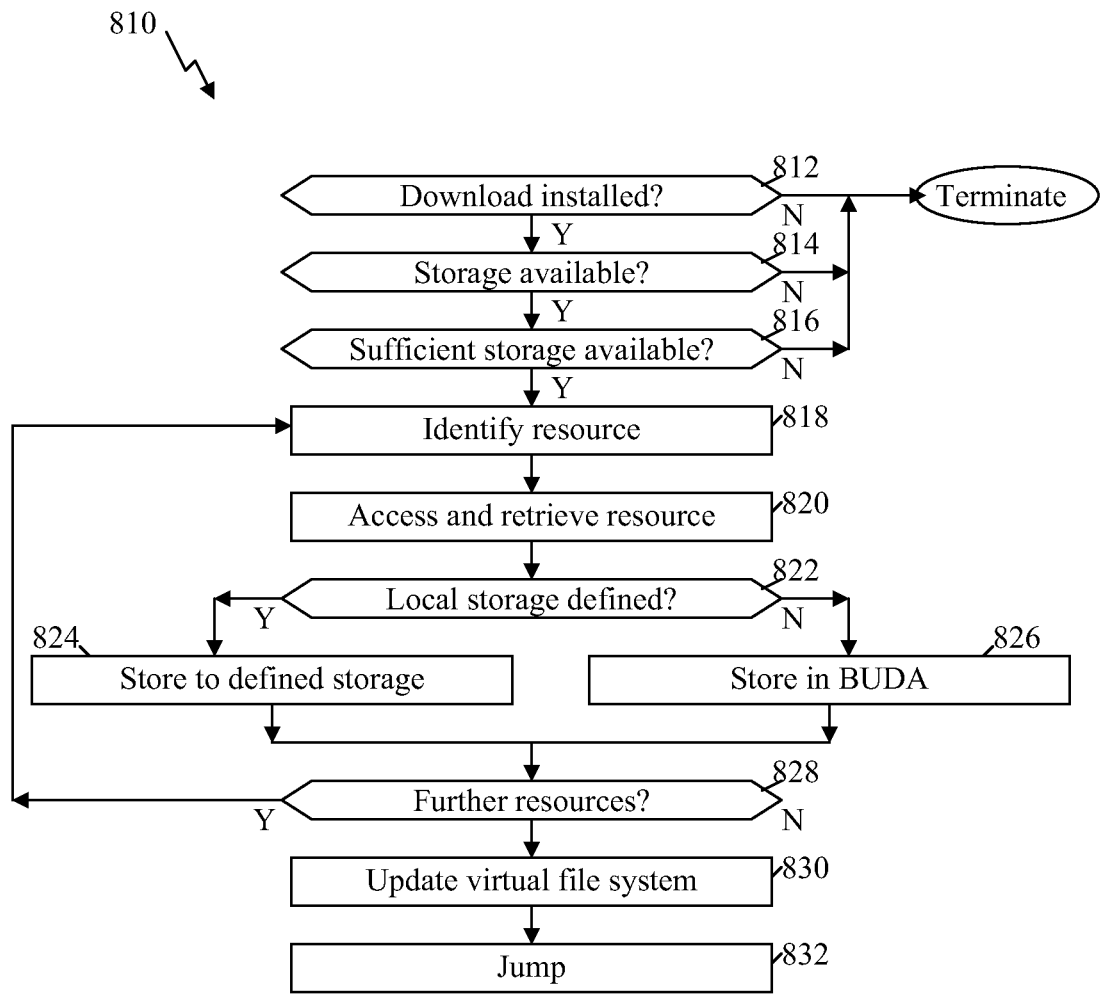
FIG. 8 depicts a simplified flow diagram of a process of downloading updated content, according to some embodiments, which can be utilized to implement one or more steps of the process depicted in FIG. 6.

FIG. 8 depicts a simplified flow diagram of a process 810 of downloading updated content, such as the updater application, according to some embodiments which can be utilized to implement the download and verification steps 624 and 626, respectively, of the process 610 of FIG. 6. In step 812 it is determined whether the update is already installed. In some instances, step 812 can be skipped or eliminated, such as when the remote source 214 determines a current version and/or update. When the update has already been received the process 810 terminates and returns to step 630 to provide normal playback in association with the current index table. In step 814, it is determined whether there is storage available or accessible in the memory 226 at the playback device 210 (whether internal or external to the playback device). When the storage is not available or accessible the process 810 terminates and returns to step 630 for playback. Alternatively, step 816 is entered to determine whether sufficient storage is available. In some embodiments, the update response received in step 732 to the request for the bootstrap update includes the file size (e.g., "fileSizeInBytes" parameter or other similar parameter). In those instances where sufficient storage is not available, the update is terminated, the process 810 is terminated and normal playback is begun with regard to step 630.

When sufficient storage is available the process continues to step 818 where a resource as specified in the update response is identified. In step 820, access to the resource is identified (e.g., the URI, URL or the like as specified in the update response) and the resource is retrieved. In step 822 it is determined whether the update response defines or designates a storage location (e.g., "localStorage" parameter). Step 824 is entered in those instances where a storage location is defined and the retrieved resource is stored to the specified storage location. Alternatively, when the storage location is not defined step 826 is entered where the resource is stored, for example in the BUDA. In some instances the resource may be stored sequentially in the BUDA based on an order of the resource elements defined in the update response. Following steps 824 and 826 the process 810 continues to step 828 where it is determined whether further resources as specified in the update response are to be retrieved. When further resources are to be retrieved the process returns to step 818 to retrieve subsequent resources. Alternatively the process 810 continues to step 832 to implement a jump to a subsequent title of the index table 410 as defined by the bootstrap application and/or object. In some embodiments step 830 is implemented, prior to initiating the jump in step 832, where a revised virtual file system is generated based on updated BUMF and BUSF files received in step 820 in accordance with the resources specified in the update response. In some embodiments, one of the resources specified in the update response can include a new or revised index table that can be utilized upon updating the virtual file system in step 830.

To minimize the delay in application startup at the playback device 210 from a user perspective, the downloaded bootstrap update is kept small, and often as small as possible while still achieving the update. For example with regard to an bootstrap update in compliance with the Blu-ray Standard, the minimum files that are downloaded when retrieving an updater application for the bootstrap update, when available, are the JAR file of the updater application, the BUMF and the BUSF. As introduced above, some bootstrap updates may additionally provide an updated index table, one or more object files (e.g., applications (e.g., an updater application), movie objects and/or other such objects), a title number for the updater application, and/or other files and/or information.

An updated index table and title number, however, typically are not needed when implementing a bootstrap update that is associated with an index table 410 that includes the updater application placeholder title 430. Instead, the bootstrap application can provide the jump to the updater placeholder title 430 after the download (step 830). Once the playback device 210 implements the jump to the placeholder title the object associated with that placeholder title, e.g., the newly downloaded and stored updater application is activated. As described above, in some implementations an empty or null updater application 452 can be authored on the disc 212 in association with the updater placeholder title 430. When downloading the updater application from the remote source 414, the downloaded updater application can replace and/or over write, within the virtual file system, the empty updater application or null file such that the downloaded and stored updater application corresponds to the updater placeholder title 430 as pre-defined in the index table 410 at least prior to implementing the bootstrap application, and in many instances at the time the disc 212 is authored and/or burned.

As described above, the remote source 214 typically has knowledge of the disc structure, and as such the "localStorage" parameter identified in the update response associated with the updater application resource and received from the remote source defines the location where the empty updater application or null file 452 is stored. When the downloaded updater application or other updated content is stored, typically to the memory 226 relative to the virtual file system, the updated content is stored at one or more locations that are associated with the updater placeholder title 430. Further in some implementations, the updated content (the downloaded updater application in this example) can be written over the null file 452 (the empty updater application in this example), when such a null file is present, such that the null file 452 is replaced by the downloaded updater application.

Upon completing the bootstrap update, the bootstrap application can terminate and initiate a jump to another title within the index table 410, such as a jump to the updater placeholder title 430 to activate the updater application, which typically updates the virtual file system using the provided BUMF and BUSF files.

In some implementations, a new index table is downloaded to execute the updater application. In these implementations, the updater application, when executed, would additionally download a subsequent index table to be used following the update or would revert to the previous index table. Alternatively as described above, the use of the placeholder titles 430-440 can avoid having to obtain an additional index table by the updater application, which can reduce in the number of files to be downloaded and reduce delay.

The use of the placeholder titles 430-440 can additionally allow updated content (e.g., updated multimedia content, menus, applications and/or functionality) to be distinct from the titles actually burned onto the disc 212 at the time the disc is burned. Further, by allowing the updated content to be distinct from the titles on the disc 212 the updated content is not required to comply with the same protection(s) and/or encryption(s) applied to the titles and corresponding content on the disc. For example, having the updater application in a different title (e.g., the updater placeholder title 430) than a feature title (e.g., "Title #1" 424) also allows the updater application to be in a different content protection system (CPS) unit or key and/or apply a different protection key. If the updater application were to be in the same CPS unit as the Title #1 feature 424, new AACS files would typically need to be downloaded during the bootstrap update process 100, which would typically result in added cost and complexity; or would typically require any content played back by the updater application to be encrypted with the same keys as the Title #1 feature 424. Configuring the title structure of the disc 212 to have the feature title 424 and the updater application in a separate CPS unit allows updated content to be played back under a different protection scheme, such as a different AACS, than a feature title 424, and allows progressive downloads and playback of media during the updater application without the media having to be encrypted with the same protection scheme, such as the same key, as the feature title 424. For example, multiple movie previews or trailers can be encrypted under a single encryption scheme that is associated with a placeholder title (e.g., placeholder 19 title 234), and multiple different discs can be configured with an index table 410 that incorporates the placeholder 19 title. As a result, the use of the placeholder titles allows content and/or applications (e.g., trailers) to be utilized across any number of different discs, as well as across multiple different content providers and/or content owners. Therefore, discs can be dynamically updated with content across multiple discs as well as across multiple different content sources and/or owners (e.g., different movie studios).

FIG. 9 depicts an example listing of at least a portion of the titles 912 defined within a title structure according to some embodiments. The title structure comprises a listing of titles 912 of an index table including placeholder titles 930-940. Further, in this example, CPS units 914 associated with each title 912 are specified. As is illustrated, in this title structure different placeholder titles 912 are associated with different CPS units 914. The FirstPlayback title 916, which in this example is associated with a bootstrap update object, is in CPS unit #1. Similarly, the Top Menu title 918, Feature/Menu title 920, and Menu/Bonus titles 922 and 924 are also in the CPS unit #1. The updater placeholder title 930, however, is in the CPS unit #2. This title structure additionally includes a first series of content placeholders 931 (e.g., placeholders 1-8, associated with title numbers (J+1) through (J+8)) are in the CPS unit #1 allowing updates of content that are available in accordance with CPS unit #1.

A second series of content placeholders 932 (placeholders 9-17, associated with title numbers (J+9) through (J+17)) are in the CPS unit #3 (which, for example, might be associated with unencrypted content); media placeholder 933-934 are in the CPS unit #4; content placeholders 935-936 are in CPS unit #5; device/content placeholders 937-938 are in CPS unit #6; and device/media placeholders 939-940 are in CPS unit #7. As a result, the title structure can be cooperated with updates through a bootstrap update and/or updater application that are protected in one or more different CPS units. Further, a disc can be configured with a title structure with predefined or pre-canned placeholder titles that take into consideration a plurality of possible combinations available, for example, in AACS or other protection schemes, and in some implementations that take into consideration all the possible combinations available in AACS. In some embodiments, a title structure can be configured such that one or two placeholder titles are established for each combination in accordance with AACS or other protection schemes to allow updated content to be cooperated with the disc without having to coordinate with a specific protection scheme of a specific title, and without having to download new AACS files during the update or pay the addition expense of obtaining the additional AACS file(s). Still further, a single title can reference multiple different content. This allows, for example, one title to be updated multiple times with different content, for example trailers, and a different title would not need to be used for each trailer.

Furthermore, by allowing a target title (e.g., placeholder 18 title 433) to be specified or designated by the remote source 414 in the update response, updates can be performed, in some instances, entirely by the bootstrap application. Because the bootstrap application can designate a jump following the bootstrap update, the bootstrap can download content and/or applications that are associated with placeholder titles 931-940 and the initiate the jump directly to the Top Menu 422, to one of the downloaded applications by jumping to the corresponding placeholder title, or substantially any other title. This can avoid additional title jumps through the updater application title and/or other such jumps, which typically reduces the latency for the user between inserting the disc to playing back content.

Figure 10:
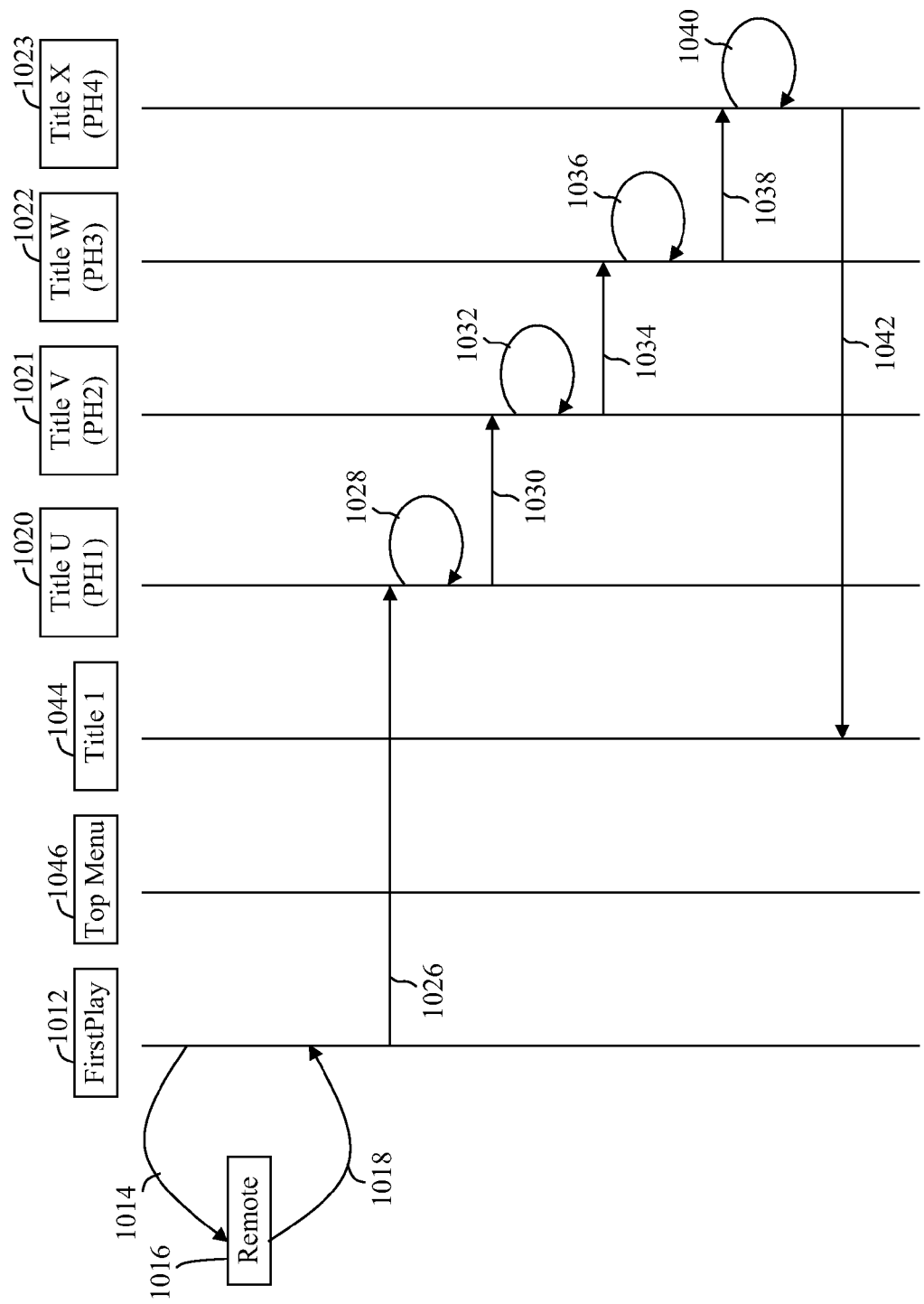
FIG. 10 depicts a simplified graphical representation of a process flow of implementing a bootstrap application and a subsequent activation of one or more applications without implementing an updater application or restarting the playback device.

As an example, the bootstrap application can download applications (i.e., associate them with placeholder titles) then activate those applications without requiring a new Index file. FIG. 10 depicts a simplified graphical representation of a process flow 1010 of implementing a bootstrap application and a subsequent activation of one or more applications without implementing an updater application or restarting the playback device. Initially, the FirstPlayback title 1012, linked with a bootstrap object, actives the bootstrap application. The activated bootstrap application connects 1014 with a remote source 1016 and downloads 1018 multiple applications, where the remote source 1016 with the knowledge of the disc title structure specifically associates each application with a placeholder titles 1020-1023. For example, the bootstrap application can download four applications: applications 1-4, and associated each application with one of four placeholder titles U, V, W and X, respectively, as defined by the remote source 1016. Further, the index table and/or bootstrap application can be pre-configured or predefined (prior to receiving the applications 1-4 and/or activation the bootstrap application) to implement a jump 1026 to title U 1020 following the download 1018. This jump 1026 actives 1028 Application 1 associated with title U 1020. The index table and/or title U 1020 can similarly be predefined or pre-configured to induce a jump 1030 to title V 1021 based on the operation of Application 1, causing an activation 1032 of Application 2. Similarly, following Application 2 a jump 1034 can be performed to title W 1022 activating 1036 Application 3 that in turn could jump 1038 to title X 1023 activating 1040 Application 4, followed again by a jump 1042 to Title 1 1044 or some other title on the disc (e.g., Top Menu 1046). As such, the bootstrap application can implement updates without an updater application, without an updated Index file, and without generating a new or updated Index file. Further, by offering the potential of useful updates without running a separate updater application the sizes of downloads can be reduced and/or the number of title jumps can be reduced.

As described above, the remote source 214 typically has intimate knowledge of the title structure, Index file 410, playlist(s) 314 and the like of a disc 212, as well as updates that have or could be applied to the to a title structure. This information is used in creating updates and implementing updates through the remote sources 214-216. Further, the remote sources 214-216 provide updated content, which can include updated multimedia content, applications, menus and the like, in response to requests from playback devices 210.

Figure 11:
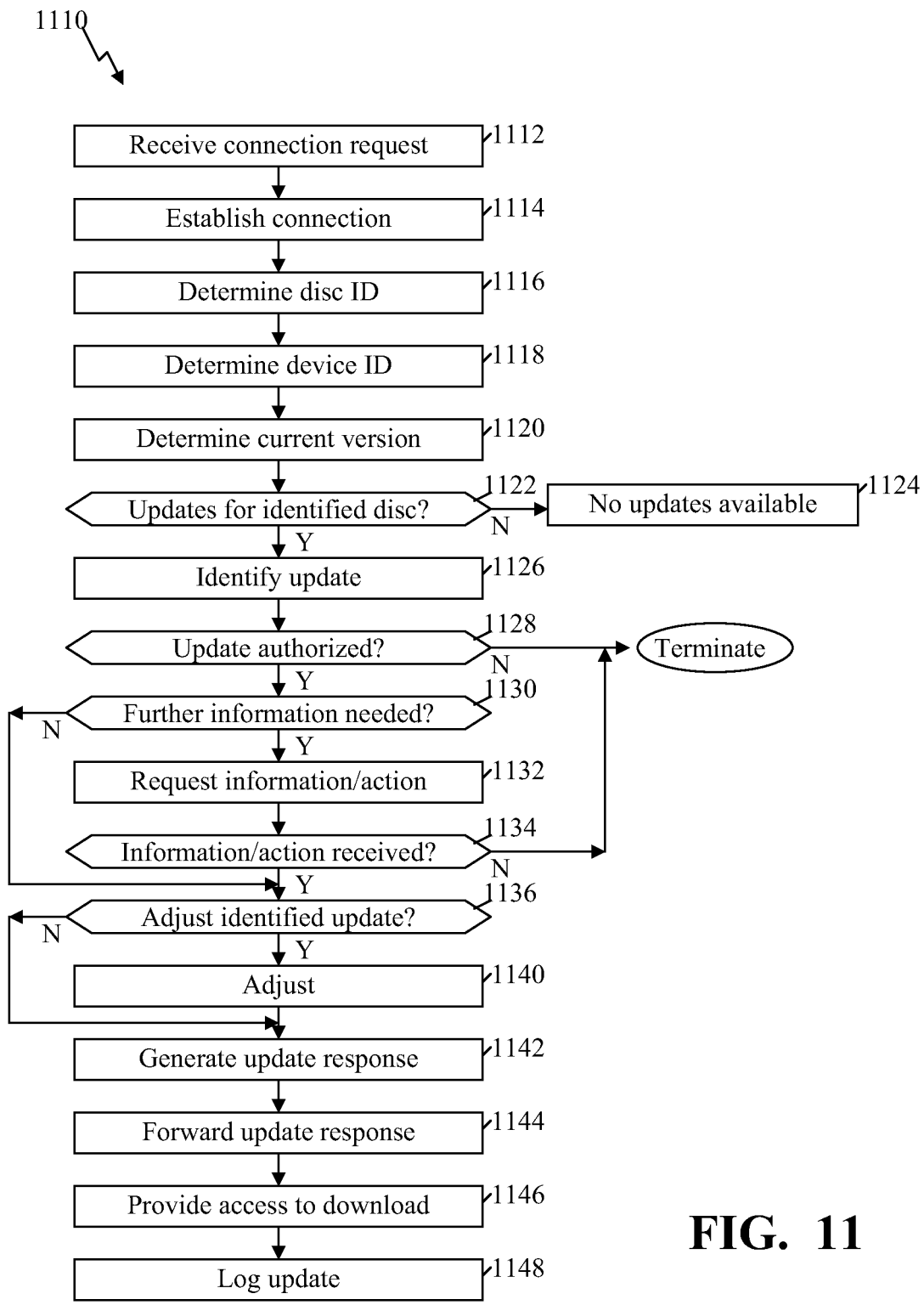
FIG. 11 depicts simplified flow diagram of a process according to some embodiments of supplying updated content from a remote source.

FIG. 11 depicts simplified flow diagram of a process 1110 according to some embodiments of supplying updated content from a remote source, such as remote source 214. In step 1112, a remote source 214 receives a request for connection from a playback device 210. In step 1114 a communication connection with the playback device 210 is established. In step 1116 an identifier of a disc 212 being directly accessed by the playback device is determined. As described above, this identification can be based on one or more identifying features that is/are typically supplied by the playback device 210, for example, in request header. In step 1118, a playback device identification, and in some instances a user identification, is determined if available. Similar to the disc identification the playback device identification can be based on numerous identification features, while the user identification can be based on a log-in name, password provided, a request from the remote source, a user profile supplied by the playback device 210 and/or stored and accessible by the remote source, and/or other such methods or combinations of methods.

In step 1120, a current version of the disc 212, index table 410 and/or prior updates associated with the identified disc are determined. Again, in some instances the playback device 210 provides this information. Alternatively or additionally, some or all of the version information may be obtained at the remote source 214 or an external device accessible by the remote source (e.g., a database 220 or other remote source 215). For example, the remote source 214 may store in a log file current versions and/or previous updates supplied in association with the identified disc and/or playback device.

In step 1122, the remote source 214 determines whether there is an update and/or additional updates for the identified disc 212 and the current version of any updates previously provided with respect to the disc and/or playback device 210. When there are no updates or more current updates are not available, the process transitions to step 1124 to notify the playback device that no further updates are available. Alternatively, when updates associated with the identified disc 212 and/or playback device 210 are available step 1126 is entered to identify an update that is applicable for the identified disc 212 and current updates already available at the playback device 210. The process 1110 then advances to step 1128 to determine whether the identified update is authorized or at least partially authorized to be distributed and utilized in cooperation with the identified disc 212, the playback device, a user and/or other such factors. The authorization can be based on one or more factors. Some of these factors can include: the user does not qualify (e.g., too young), an upgrade has not been purchased, the playback device does not have sufficient functionality (e.g., processing capacities, memory size, display capabilities, interactive capabilities, supporting external device such as a controller or joy stick, and the like), previous conditions have not been satisfied (e.g., user has not registered with the content owner, a previous update has not yet been implemented for a predefined period, purchased additional software, etc.), and other such factors or combinations of factors.

Additional and/or alternative parameters, variables and/or factors can be considered in identifying one or more updates and/or determining whether one or more updates can be provided to the playback device 210. This can include evaluating one or more variables, factors and/or parameters, such as but not limited to a playback device ID; a playback device manufacturer ID; a user or customer ID, a disc ID, which can be substantially any relevant indication that can be used to identify a disc; one or more organization IDs, which in some instances can be used in combination with the disc ID to create a unique key to determine the disc, and as a specific example, the organization ID may be a 128 bit hexadecimal formatted ID value that helps indicate the disc making the request; a protocol ID that can specify, for example, a version of an update application to utilize at the remote source, which can be identified for example by an integer value; a version, which can define a version number the update requested and/or returned; a version ID (e.g., a parameter that can be used to determine whether a change has occurred since a previous update, where in some instances the version ID can be a globally unique identifier (GUID) that indicates whether a package change has occurred since a previous update (which can be a predefined GUID or empty GUID when an update or bootloader application has not previously been downloaded)); a volume ID can further define a disc requesting the update, where in some instances the volume ID can be a 512 bit hexadecimal format ID value of the disc making the request, and it is noted that the volume ID may change based on replication sources and other variables during disc creation; PMSN as read from the disc, which in some instances can be provided as a default value if the PMSN cannot be obtained from the disc; BCA; IP address; ISAN; one or more geographic information and/or codes; location information and/or codes; country code determined from a network address or as set at the playback device, for example, when the request was issued; a region code that is determined based on a network address or as set at the playback device; one or more identifications of a language specified or requested by the application attempting to obtain an update; a rent or rental code designated whether a disc is a rented disc versus a disc purchased by a user; a single code that designates whether the disc is a individual disc or whether the disc is part of a set, such as a box set, of discs; a menu language, which in some instances can define a menu language at the playback device set when making the request; audio language, which in some instances can define an audio language at the playback device that was set when the request was made; subtitle language, which in some instances can define subtitle language that was set at the playback device when making the request; available local storage in the memory 226; a BUDA size; an available BUDA and/or free BUDA space; BUDA performance; an application data area (ADA) size, which in some instances specifies a size of the ADA when the player is making the request to the server (e.g., 64 kilobytes); ADA free space defining an amount the area available on the ADA; copy capabilities, such as a managed copy capability, that can indicate whether the playback device has the ability to support managed copy, which allows a player to synchronize a media device with a digital second copy of the disc, for example, utilizing AACS; one or more identifiers of content recorded on the disc (e.g., a feature content ID); and other such information and/or combinations of such information. Further, one or more of the above identified variables may additionally or alternatively be used in analytics, evaluations of requests, tracking and/or other such actions. Further still, the playback device 210 may utilize one or more of these variables in selecting one or more relevant updates.

Furthermore, in some instances, the update (or identification of potentially relevant updates) may not be provided (or requested) unless multiple variables are confirmed and/or matched with an available updated. For example, when it is determined that an update is not available that matches or corresponds to each of plurality of variables then an update is not provided or a default update may be provided (when not previously provided to the playback device), or nothing is returns when a default update does not exist or that was previously provided to the playback device. As one example, an update may be provided when a disc ID, an organization ID, a version ID, a protocol ID and a region ID correspond to variables defined for the update. As another example, an update may be provided when a disc ID, an organization ID, a protocol ID, a version, a version ID, a menu language, a region code, a rental parameter and a single parameter correspond to variables defined for the update.

When it is determined in step 1128 that the identified update is authorized or at least partially authorized to be distributed the process 1110 continues to step 1130 where it is determined whether further information and/or interaction is needed prior to distributing the update. This additional information or interaction, as described above, can include receiving a payment or verifying a payment, receiving a password or code, or other such information. In some implementations, step 1130 is additionally or alternatively entered when it is determined in step 1128 that the identified update is not authorized, but authorization may be obtained upon receiving further information or actions. When further information or interaction is desired, a request is communicated in step 1132 requesting the information or action. In step 1134 it is determined whether the information or action has been received and/or confirmed. In those instances where it has not, the process 1110 issues an error and terminates. Alternatively, the process continues to step 1136.

In step 1136, a determination is made as to whether further updating and/or adjustments should be made to the identified update. This further updating may be based on the version information provided, a communication link, security levels, an identified copy protection (e.g., a CPS unit) that should be applied to some or all of the identified update (e.g., based on intimate knowledge at the remote source of the title structure of the disc 212, any previous updates and/or alterations, and the like).

Step 1140 is entered when further adjustments or updating is to be implemented where the updating is preformed, and in some instances logged or otherwise recorded. In step 1142 an update response is generated identifying resources of the update and access to the resources, as described above. In some embodiments the update response further identifies the location where one or more resources of the update are to be stored. Again, because the remote source 214 has knowledge of the title structure and/or index table of the disc, the remote source can identify a placeholder title within the title structure for which updated content is to be associated. The remote source can further identify the storage location where the updated content is to be incorporated into the virtual file system in accordance with the storage location associated with and/or defined by the placeholder title. In step 1144 the update response is forwarded to the playback device 210. The process 1110 then advances to step 1146 to provide the playback device 210 with access to download the one or more resources in accordance with the designated locations, e.g., URL. In step 1148 the remote source 214 records or logs the supplied update or partial update.

As described above, the remote source 214 can provide tracking and/or reporting functions regarding updates, errors, fixes and the like. Further, the remote source can implement and control, remotely, debugging of a disc at a playback device 210. In some implementations the remote source 214 is further capable of enabling and/or disabling content, including content recorded on the disc 212.

Figure 12:
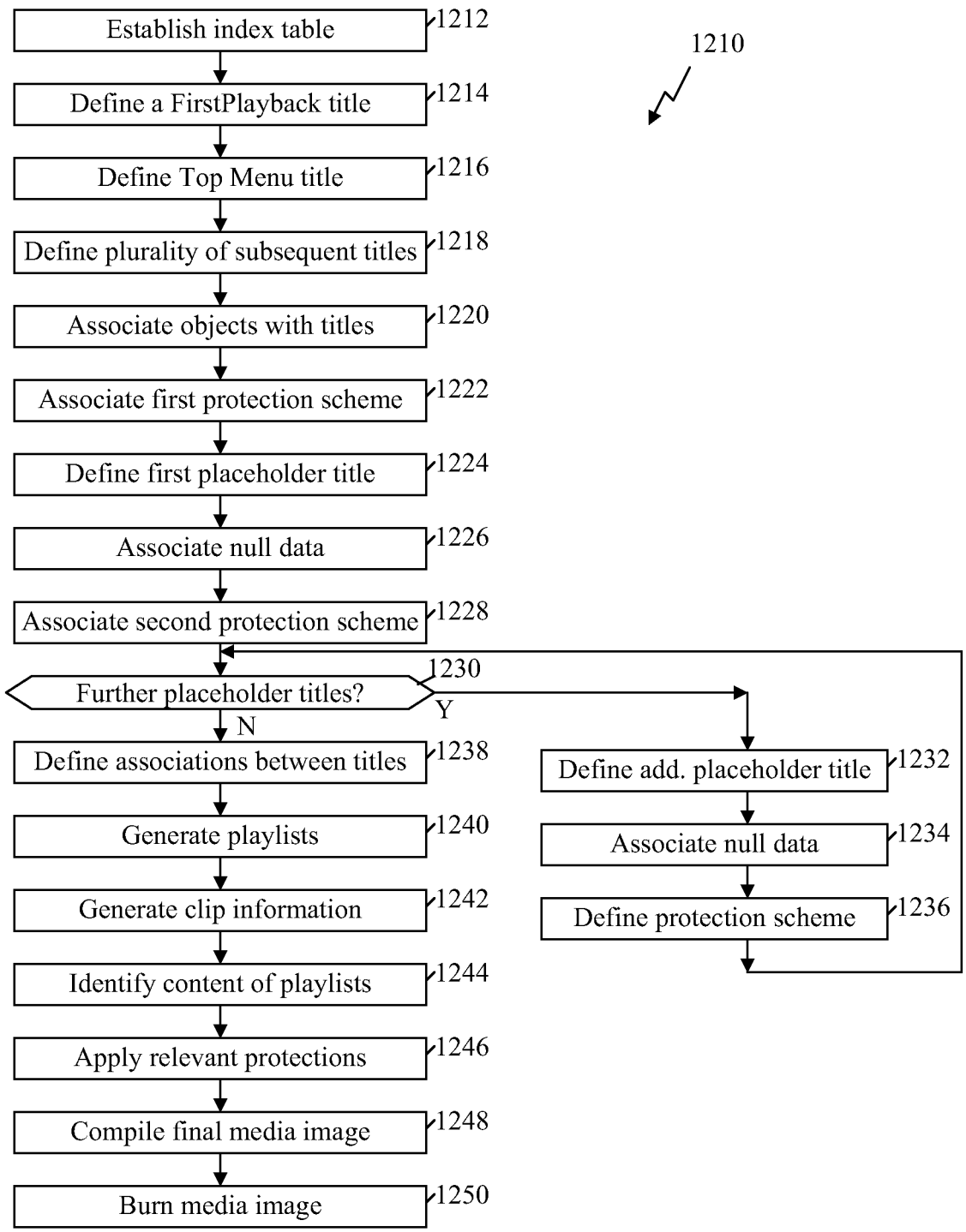
FIG. 12 depicts a simplified flow diagram of a process of authoring and/or generating a media image to be recorded and/or burned onto a read only disc or other such computer and/or processor readable portable storage medium.

FIG. 12 depicts a simplified flow diagram of a process 1210 of authoring and/or generating a media image to be recorded and/or burned onto a read only disc or other such computer readable portable storage medium. In step 1212, an index table, such as the index table 410 of FIG. 4, is initially established and will dictate how the playback device 210, accessing a disc burned with the authored media image, will access and/or playback content from the disc. In step 1214, a FirstPlayback title is defined and is associated with the bootstrap application. Typically, the FirstPlayback title is the first and initial title that is accessed by the playback device 210 upon initially accessing the index table. Further, the bootstrap application, as described above, induces access over the network 218 to the remote source, such as remote source 216, to download updated content.

In step 1216, a Top Menu title is defined and associated with a movie object (e.g., movie object 442) that will provide a menu upon playback. In step 1218, a plurality of subsequent titles are defined within the index table 410. In step 1220 a different object, such as a movie object or a BD-J object, is associated with each of the plurality of subsequent titles. In step 1222, a CPS unit number or other protection scheme is associated with and defined for the FirstPlayback title, the top menu title and the plurality of subsequent titles.

In step 1224, a first placeholder title is defined within the index table. In step 1226 the first placeholder title is associated with first null data. In step 1228, the first placeholder is associated with a second CPS unit number or protection scheme that is different than the first protection scheme associated with the FirstPlayback title, Top Menu title and other titles. In step 1230 it is determined whether further placeholder titles are to be defined. In those instances where further placeholder titles are not to be defined the process advances to step 1238. Alternatively, step 1232 is entered where one or more additional placeholder title structures are defined. In optional step 1234, one or more of the additional placeholder titles can be associated with respective null data. In step 1236 a CPS unit number and/or protection scheme is defined for the one or more placeholder titles. In some instances, one or more of the additional placeholder titles may be associated with an unprotected scheme and/or may be associated with unencrypted content. The process 1210 then returns to step 1230 to determine whether additional placeholder titles are to be incorporated. As described above, at least with reference to FIG. 9, substantially any number of placeholder titles and/or groups of placeholder titles can be cooperated into the index table 410. Further in some instances, a number of placeholder titles are defined so that there are one or two placeholder titles associate with each expected protection scheme. This will allow updated content to later be provided in accordance with the disc on which the media image is recorded, when the updated content does not comply with the protection scheme of the main title(s) and/or feature(s) of the disc.

In step 1238, associations between titles are defined within the index table 410. For example, the FirstPlayback title can be defined with a title jump that designates a jump to the first placeholder title following the completion of the bootstrap application (e.g., which may conclude with the updating and/or regeneration of the virtual file system). In step 1240, playlists 316 are generated for one or more of the titles defined within the index table 410. In step 1242, clip information is generated and/or defined for each playlist. In step 1244, the content associated with each playlist is identified. In step 1246, relevant protections are applied to the contents of the media image. In step 1248, a final media image is generated and compiled. In step 1250, the media image is burned to one or more discs.

Some present embodiments, at least in part, provide an on disc application that facilitates an update of the disc with new content (and/or enhanced content) over a network connection without prior knowledge of the new content. This application typically is implemented prior to any other application on the disc (e.g., menus, video playback, and the like) to allow the application to potentially update these applications before they are launched by the disc. As described above, however, some applications may intentionally be configured to implement prior to this application, for example, when the application makes a determination that would affect or dictate whether the application is in fact run (e.g., providing an override that might prevent the running of the updating application).

Further, this application in addition to facilitating the updating of a disc, in some embodiments, further provides the ability to update a disc without knowing what the update includes or contains. It is noted that the Blu-ray Specification enables some functionality with respect to what is referred to as updates with Blu-ray compliant discs. These described updates, however, typically required knowledge of the updates and how they would be applied to the disc during the initial authoring of the disc and prior to distribution of the disc. This generally limits updates typically to updates that are known and/or are predicted. The present embodiments overcome these disadvantages by, in part, defining placeholder titles 430-440 within the index table 410 that are utilized to provide the flexibility and functionality to accommodate unknown updates. Further, some of these placeholder titles 430-440 can further be configured in accordance with predefined security schemes (e.g., typically defined at the initial authoring) that again provides added flexibility along with avoiding the need to later attempt to acquire additional access to protection schemes and the cost associated with acquiring access to these schemes.

Some embodiments comprise methods of providing updating content to be played back in cooperation with a portable processor readable medium. These methods receive, over a network from a remote source, updated content to be accessed in association with a processor readable portable storage medium; receive, over the network from the remote source, in association with the received updated content a designation that the updated content is to be associated, and in some instances exclusively associated, with a first placeholder title as defined in an index table recorded on the portable storage medium; and store the updated content, on a separate processor readable storage medium that is different than the portable storage medium, such that the updated content is associated, and in some instances exclusively associated, with the first placeholder title and accessible in association with the first placeholder title as dictated by the index table.

Additionally in some implementations the storing the updated content comprises writing the updated content over null data stored at the identified storage location that was previously associated with a first placeholder title. Further, some embodiments detect an initial access, through an playback device, to the portable storage medium; access the index table in response to the detecting the initial access; access a FirstPlayback title; activate, in response to accessing the FirstPlayback title, a first application that corresponds, as defined in the index table, with the FirstPlayback title; and communicate the request as dictated by the first application such that the receiving the updated content comprises receiving the updated content in response to the communicating the request. In some instances, the FirstPlayback title is associated with a first protection scheme and the first placeholder title is associated with a second, different protection scheme; and the updated content received from the remote source is associated with the second protection scheme and not the first protection scheme.

Some embodiments provide methods of authoring a media image to be recorded on a processor readable portable storage medium, which in some instances may be a read only processor readable portable storage medium. These methods of authoring establish an index table that dictates the playback of content in association with accessing the portable storage medium; define a first title within to the index table; associate the first title with a first application object; define a second title within the index table; associate the second title with a first multimedia object; define a first placeholder title within the index table; and associate first null data with the first placeholder title.

Further, with at least some embodiments, the defining the first title comprises associating the first title with a first protection scheme; the defining the second title comprises associating the second title with the first protection scheme; and the defining the first placeholder title comprises associating the placeholder title with a second protection scheme that is different than the first media scheme. Some embodiments define a second placeholder title within the index table; associate second null data with the second placeholder title; and the defining the second placeholder title comprises associating the second placeholder title with unprotected content. Additionally or alternatively, some embodiments define a plurality of additional placeholder titles within the index table and associate the each of the plurality of additional placeholder titles with a protection scheme that is different than the first protection scheme, different than the second protection scheme and different than each protection scheme associated with the other additional placeholder titles. In some instances the defining the first title within to the index table comprises defining a title jump to the first placeholder title upon a completion of an action in accordance with the first application object. In other instances, the first application object defines and initiates a jump to a title or placeholder title. Further in some embodiments, the first application object comprises a bootstrap application that induces access over a network to a remote source and downloading of updated content to be associated with the first placeholder title. Still further with some embodiments, the defining the title jump comprises defining the title jump to the first placeholder upon completing the download of the updated content. The first title, according to some embodiments, comprises an initial title to be accessed by the playback device upon initially accessing the index table. In some implementations the bootstrap application is configured to further induce an update of a virtual file system following the download of the updated content.

Further embodiments include methods of providing, over a network to a remote playback device locally accessing a processor readable portable storage medium, updated content for content recorded on the portable storage medium. These methods receive, over a network from a remote playback device locally accessing a processor readable portable storage medium, a request for updated content for the portable storage medium; identify updated content for use with the portable storage medium; identify a title structure of the portable storage medium; identify a placeholder title within the identified title structure with which the updated content is to be associated; identify, as defined by the identified placeholder title within the identified title structure, a storage location of content to be accessed by the playback device in accordance with instructions relative to the placeholder title; forward an update response identifying the updated content and instructions that the playback device store, within a virtual file system at the playback device, the updated content at the storage location.

Additionally, some embodiments provide methods of acquiring updated content to be played back in association with a processor readable portable storage medium, at least in part, by detecting access to a processor readable portable storage medium; accessing an index table associated with the portable storage medium; implementing a first application as defined by the index table, where the implementing the first application comprises: requesting, over a network, an update to the portable storage medium from a remote source; receiving, over the network, updated content from the remote source; identifying that the updated content is to be associated with a placeholder title defined in the index table; storing, within a virtual file system on a separate processor readable storage medium, the updated content such that the updated content is associated with the placeholder title; and initiating a title jump, within the index table, to the placeholder title; accessing, in response to the title jump to the placeholder title, the updated content as defined by the placeholder title; and initiating, in response to accessing the updated content, a second application from the updated content. In some instances the accessing an index table associated with the portable storage medium comprises accessing an index table exclusively associated with the portable storage medium. Additionally or alternatively, the storing the updated content can comprise storing the updated content over null data that is associated with, at the time the portable storage medium was authored, a placeholder title in the index table.

Still further, some embodiments comprise methods of providing updated content associated with a read only processor readable portable storage medium. These methods detect local access to a processor readable portable storage medium; access an index table associated with the portable storage medium; detect, in accordance with the index table, an instruction to implement an update of the portable storage medium; identify, in response to the detecting the instruction, a remote source from which an update for the portable storage medium is to be obtained; request, over a network, the update from the remote source; receive updated content from the remote source; receive a storage location defined within a virtual file system stored on a separate processor readable medium; and store, in the virtual file system, the updated content at the storage location designated by the remote source such that the updated content is associated with a placeholder title defined within the index table such that the updated content is accessed in association with the placeholder title. In some instances, the access to an index table associated with the portable storage medium comprises accessing an index table exclusively associated with the portable storage medium.

Still further, some embodiments provide methods of acquiring updated content to be played back in association with a processor readable portable storage medium. These methods detect access to a processor readable portable storage medium; access, in response to detecting the initial access, an index table exclusively associated with the portable storage medium; implement a first application as defined by the index table, the implementing the first application comprising: requesting, over a network, an update to the portable storage medium from a remote source; receiving, over the network, updated content from the remote source; identifying that the updated content is to be associated with a placeholder title defined in the index table; storing, within a virtual file system on a separate processor readable storage medium, the updated content such that the updated content is associated with the placeholder title; and initiating a title jump, within the index table, to the placeholder title; access, in response to the title jump to the placeholder title, the updated content as defined by the placeholder title; and initiate, in response to accessing the updated content, playback of the updated content.

Additionally, some embodiments provide methods of acquiring updated content to be played back in association with a processor readable portable storage medium, where these methods detect access to a processor readable portable storage medium; access, in response to detecting the initial access, an index table exclusively associated with the portable storage medium; request, over a network, an update to the portable storage medium from a remote source; receive, over the network and from the remote source, an identification of one or more relevant updates associated with the portable storage medium; communicate a selection of one of the one or more relevant updates; and receive, over the network, update content comprising the selecting one of the one or more relevant updates. In some implementations, some of these embodiments identify that the updated content is to be associated with a placeholder title defined in the index table; store, within a virtual file system on a separate local processor readable storage medium, the updated content such that the updated content is associated with the placeholder title; initiate a title jump, within the index table, to the placeholder title; and access, in response to the title jump to the placeholder title, the updated content as defined by the placeholder title. Some embodiments may additionally initiate, in response to accessing the updated content, a second application from the updated content, and/or initiate, in response to accessing the updated content, playback of at least a portion of the updated content.

Some embodiments provide methods of updating content associated with a processor readable portable storage medium. These methods detect local access to a processor readable portable storage medium; access an index table exclusively associated with the portable storage medium; detect, in accordance with the index table, an instruction to implement an update of the portable storage medium; request, over a network, an update from a remote source; receive updated content from the remote source; receive a storage location within a virtual file system stored on a separate processor readable medium; and store, in the virtual file system, the updated content at the storage location designated by the remote source such that the updated content is associated with a placeholder title defined within the index table such that the updated content is accessed in association with the placeholder title. Further, some of these embodiments receive, from the remote source and in response to the request for the update, a listing of one or more relevant updates; and communicate a selection of one of the one or more relevant updates to the remote source, wherein the receiving the updated content from the remote source comprises receiving the updated content for the selected one of the relevant updates.

While the invention herein disclosed has been described by means of specific embodiments and applications thereof, numerous modifications and variations could be made thereto by those skilled in the art without departing from the scope of the invention set forth in the claims.

What is claimed is:

1. A method of providing updating content to be played back in cooperation with a portable processor readable medium, the method comprising:

receiving, at a playback device from over a network and from a remote source, updated content to be accessed in association with a processor readable portable storage medium being locally accessed by the playback device;

receiving, over the network from the remote source, in association with the received updated content a designation that the updated content is to be associated with a first placeholder title as defined in an index table being implemented in association with playback in cooperation with the portable storage medium where the index table is local to and accessed by the playback device and dictates playback of content in association with the playback device accessing the portable storage medium, and where the first placeholder title is one title of a series of a plurality of titles defined in the index table with a first plurality of the plurality of titles corresponding to content recorded on the portable storage medium and the first placeholder title corresponding to a null object on the portable storage medium;

storing the updated content, on a separate processor readable storage medium that is different than the portable storage medium and local to the playback device, such that the updated content is associated with the first placeholder title and accessible in association with the first placeholder title while implementing playback as dictated by the index table;

detecting local access to the portable storage medium;

accessing the index table associated with the portable storage medium;

detecting, in accordance with the index table, an instruction to implement the update of the portable storage medium, wherein the update content further comprises an updated binding unit manifest file.

2. The method of claim 1, wherein the receiving the designation comprises receiving, from the remote source, an identification of a storage location on the separate storage medium, where the storage location is predefined in the index table, prior to the receiving the updated content, as being exclusively associated with the first placeholder title.

3. The method of claim 1, further comprising:
detecting an initial access, through the playback device, to the portable storage medium;
accessing the index table in response to the detecting the initial access;
accessing a FirstPlayback title, wherein the FirstPlayback title is a first title defined within the index file and a first title within the index file referenced by the playback device upon the initial access to the portable storage medium;
activating, in response to accessing the FirstPlayback title, a first application that corresponds, as defined in the index table, with the FirstPlayback title; and
communicating a request as dictated by the first application such that the receiving the updated content comprises receiving the updated content in response to the communicating the request.

4. The method of claim 3, further comprising:
implementing a title jump to the first placeholder title, as predefined in the index table, associated to the FirstPlayback title, after initiating the request for the updated content.

5. The method of claim 4, further comprising:
activating, in response to the title jump to the first placeholder title, a second application, where the updated content comprises the second application.

6. The method of claim 5, further comprising:
generating an updated virtual file system as defined by the updated content associated with the first placeholder title.

7. The method of claim 1, wherein the null object comprises a file on the portable storage medium that is empty.

8. The method of claim 7, wherein the null object is further associated with a plurality of additional placeholder titles as defined in the index table being implemented in association with the playback in cooperation with the portable storage medium.

9. The method of claim 8, wherein the null object comprises a file on the portable storage medium that stores unusable data.

10. The method of claim 1, wherein the null object comprises unusable data that is unusable by the playback device.

11. The method of claim 1, wherein the index table is stored on the portable storage medium.

12. The method of claim 11, further comprising:
detecting an initial access, through the playback device, to the portable storage medium;
accessing the index table in response to the detecting the initial access;
accessing a FirstPlayback title, wherein the FirstPlayback title is a first title defined within the index file and a first title within the index file referenced by the playback device upon the initial access to the portable storage medium;
activating, in response to accessing the FirstPlayback title, a first application that corresponds, as defined in the index table, with the FirstPlayback title; and
communicating the request as dictated by the first application such that the receiving the updated content comprises receiving the updated content in response to the communicating the request.

13. The method of claim 1, further comprising:
identifying a current version of content previously received;
communicating a request, in response to accessing the first placeholder title, to the remote source a request for updated content and the current version of the content;
wherein the receiving the updated content comprises receiving the updated content in response to the request where the updated content is an update of the current version of the content.

14. The method of claim 1, further comprising:
accessing the updated binding unit manifest file; and
re-generating a virtual file system in accordance with the updated binding unit manifest file.

15. The method of claim 14, further comprising:
replacing a previously stored binding unit manifest file with the updated binding unit manifest file.

16. The method of claim 1, further comprising:
receiving, from the remote source and in response to a request for an update, a listing of one or more relevant updates; and
communicating a selection of at least one of the one or more relevant updates to the remote source, wherein the receiving the updated content from the remote source comprises receiving the updated content for the selected at least one of the relevant updates.

* * * * *